(12) United States Patent
Kusukame et al.

(10) Patent No.: US 11,318,811 B2
(45) Date of Patent: May 3, 2022

(54) WAKEFULNESS INDUCING DEVICE AND WAKEFULNESS INDUCING SYSTEM

(71) Applicant: Panasonic Intellectual Property Management Co., Ltd., Osaka (JP)

(72) Inventors: Koichi Kusukame, Osaka (JP); Shinichi Shikii, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 160 days.

(21) Appl. No.: 16/465,737

(22) PCT Filed: Nov. 14, 2017

(86) PCT No.: PCT/JP2017/040872
§ 371 (c)(1),
(2) Date: May 31, 2019

(87) PCT Pub. No.: WO2018/105331
PCT Pub. Date: Jun. 14, 2018

(65) Prior Publication Data
US 2019/0299744 A1 Oct. 3, 2019

Related U.S. Application Data

(60) Provisional application No. 62/431,598, filed on Dec. 8, 2016.

(51) Int. Cl.
*B60H 1/00* (2006.01)
*F24F 11/62* (2018.01)
(Continued)

(52) U.S. Cl.
CPC .......... *B60H 1/00742* (2013.01); *B60H 1/00* (2013.01); *B60H 3/00* (2013.01); *B60K 28/06* (2013.01);
(Continued)

(58) Field of Classification Search
None
See application file for complete search history.

(56) References Cited

U.S. PATENT DOCUMENTS

| 8,022,831 B1 * | 9/2011 | Wood-Eyre | B60T 7/14 340/575 |
| 2009/0216509 A1 * | 8/2009 | Baker | G06F 30/20 703/11 |

(Continued)

FOREIGN PATENT DOCUMENTS

| JP | 2005075198 A | * | 3/2005 |
| JP | 2005-186657 | | 7/2005 |

(Continued)

OTHER PUBLICATIONS

International Search Report (ISR) dated Feb. 6, 2018 in International (PCT) Application No. PCT/JP2017/040872.

(Continued)

*Primary Examiner* — Mohammad Ali
*Assistant Examiner* — David Earl Ogg
(74) *Attorney, Agent, or Firm* — Wenderoth, Lind & Ponack, L.L.P.

(57) ABSTRACT

A wakefulness inducing device includes: a heat dissipation intensity obtainer obtaining a user's heat dissipation intensity from a heat dissipation intensity sensor; and a controller controlling an air conditioner to alternate the user's heat dissipation intensity between a first heat dissipation intensity and a second heat dissipation intensity lower than the first heat dissipation intensity. The controller alternates the user's heat dissipation intensity by controlling the air conditioner based on the user's heat dissipation intensity to set a first time period longer than a second time period. In the first time period, the user's heat dissipation intensity increases from the second heat dissipation intensity to the first heat dissipation intensity, or remains at the first heat dissipation (Continued)

intensity. In the second time period, the user's heat dissipation intensity decreases from the first heat dissipation intensity to the second heat dissipation intensity, or remains at the second heat dissipation intensity.

14 Claims, 10 Drawing Sheets

(51) Int. Cl.
      *F24F 11/30*      (2018.01)
      *B60K 28/06*      (2006.01)
      *G05B 19/042*     (2006.01)
      *G08B 6/00*       (2006.01)
      *G08B 21/06*      (2006.01)
      *B60H 3/00*      (2006.01)
      *G08G 1/16*      (2006.01)

(52) U.S. Cl.
      CPC .............. *F24F 11/30* (2018.01); *F24F 11/62* (2018.01); *G05B 19/042* (2013.01); *G08B 6/00* (2013.01); *G08B 21/06* (2013.01); *G08G 1/16* (2013.01); *B60T 2220/02* (2013.01); *G05B 2219/2614* (2013.01)

(56) References Cited

U.S. PATENT DOCUMENTS

| | | | | |
|---|---|---|---|---|
| 2009/0306536 | A1* | 12/2009 | Ranganathan | A61B 5/6804 600/549 |
| 2013/0304328 | A1* | 11/2013 | Chang | B60K 35/00 701/45 |
| 2014/0371984 | A1* | 12/2014 | Fung | B60W 10/30 701/38 |
| 2015/0038855 | A1* | 2/2015 | Berckmans | A61B 5/18 600/483 |

FOREIGN PATENT DOCUMENTS

| | | | |
|---|---|---|---|
| JP | 2012001056 A | * | 1/2012 |
| JP | 2013012029 A | * | 1/2013 |

OTHER PUBLICATIONS

Kaori Otomo, et al., "The combined effect of thermal and lighting environment on arousal level" (with English translation).

Koichi Kusukame, et al., "A New Proposal of Estimation Method for Thermal Sensation Using Infrared Thermography", The Fifth International Conference on Human-Environment System, ICHES2016, Nagoya, Oct. 29-Nov. 2, 2016.

* cited by examiner

WAKEFULNESS INDUCING DEVICE AND WAKEFULNESS INDUCING SYSTEM

TECHNICAL FIELD

The present disclosure relates to a wakefulness inducing device and a wakefulness inducing system.

BACKGROUND ART

Devices for inducing the wakefulness of people to reduce sleepiness of the people have been suggested. For example, Patent Literature (PTL) 1 discloses a device that controls an air conditioner to stimulate a person with, for example, heat, thereby inducing the wakefulness of the person.

CITATION LIST

Patent Literature

PTL 1: Unexamined Patent Application Publication No. 2005-186657

SUMMARY OF THE INVENTION

Technical Problem

However, for example, if an air conditioner is controlled to stimulate people with heat, thereby inducing the wakefulness of people; heat of the same temperature may awaken some people easily, but others not, due to personal differences.

The present disclosure provides a wakefulness inducing device and a wakefulness inducing system that appropriately induce wakefulness in accordance with individuals.

Solutions to Problem

In order to achieve the objective, a wakefulness inducing device according to a first aspect of the present disclosure includes: a heat dissipation intensity obtainer that obtains a heat dissipation intensity of a person from a heat dissipation intensity sensor; and a controller that controls an air conditioner to alternate the person's heat dissipation intensity between a first heat dissipation intensity and a second heat dissipation intensity lower than the first heat dissipation intensity. The controller alternates the person's heat dissipation intensity by controlling the air conditioner based on the person's heat dissipation intensity obtained by the heat dissipation intensity obtainer to set a first time period longer than a second time period. The first time period is a time period in which the person's heat dissipation intensity increases from the second heat dissipation intensity to the first heat dissipation intensity, or remains at the first heat dissipation intensity. The second time period is a time period in which the person's heat dissipation intensity decreases from the first heat dissipation intensity to the second heat dissipation intensity, or remains at the second heat dissipation intensity.

A wakefulness inducing system according to a first aspect of the present disclosure includes: the wakefulness inducing device, the heat dissipation intensity sensor, and the air conditioner.

Advantageous Effect of Invention

The present disclosure provides a wakefulness inducing device and a wakefulness inducing system that appropriately induce the wakefulness of people in accordance with the individuals.

DESCRIPTION OF EXEMPLARY EMBODIMENTS

Outline of Present Disclosure

Figure 1:
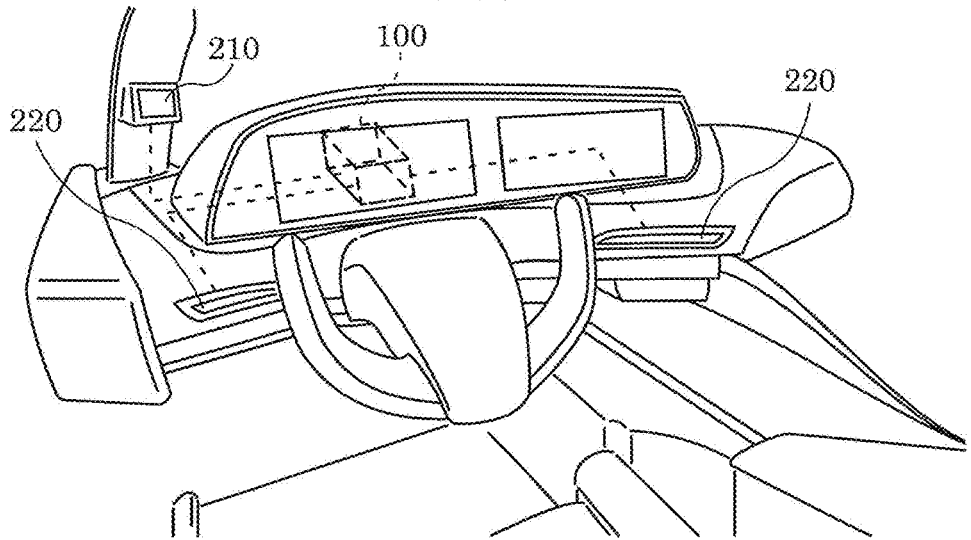
FIG. 1 is a schematic view illustrating a system including a wakefulness inducing device according to Embodiment 1.

In order to achieve the objective, the wakefulness inducing device according to the first aspect of the present disclosure includes: a heat dissipation intensity obtainer that obtains a heat dissipation intensity of a person from a heat dissipation intensity sensor; and a controller that controls an air conditioner to alternate the person's heat dissipation intensity between a first heat dissipation intensity and a second heat dissipation intensity lower than the first heat dissipation intensity. The controller alternates the person's heat dissipation intensity by controlling the air conditioner based on the person's heat dissipation intensity obtained by the heat dissipation intensity obtainer to set a first time period longer than a second time period. The first time period is a time period in which the person's heat dissipation intensity increases from the second heat dissipation intensity to the first heat dissipation intensity, or remains at the first heat dissipation intensity. The second time period is a time period in which the person's heat dissipation intensity decreases from the first heat dissipation intensity to the second heat dissipation intensity, or remains at the second heat dissipation intensity.

With this configuration, the wakefulness inducing device controls the air conditioner based on the heat dissipation intensity of the person whose wakefulness is to be induced. That is, the wakefulness inducing device controls air conditions in view of personal differences among people whose wakefulness is to be induced. Accordingly, the wakefulness inducing device according to the aspect of the present disclosure appropriately induces the wakefulness of people in accordance with the individuals.

For example, the first heat dissipation intensity may be 45 W/m$^2$ or lower. The second heat dissipation intensity may be 25 W/m$^2$ or higher.

With this configuration, the wakefulness inducing device reduces discomfort, caused in controlling the air conditioner, of the person whose wakefulness is to be induced. Accordingly, the wakefulness inducing device according to the aspect of the present disclosure reduces the discomfort, and appropriately induces the wakefulness of people in accordance with the individuals.

For example, to increase the person's heat dissipation intensity, the controller may cause the air conditioner to blow, to the person, air with a temperature lower than or equal to a temperature around the person.

This configuration simply and easily increases the person's heat dissipation intensity.

For example, to decrease the person's heat dissipation intensity, the controller may cause the air conditioner to blow, to the person, air with a temperature higher than a temperature around the person.

This configuration simply and easily decreases the person's heat dissipation intensity.

For example, the controller may cause the air conditioner to selectively execute a plurality of operating modes, among which values of at least one of the first heat dissipation intensity, the second heat dissipation intensity, the first time period, or the second time period are different. The wakefulness inducing device may further include a receiver that receives, from the person, an instruction indicating one of the plurality of operating modes. The controller may cause the air conditioner to execute the one of the plurality of operating modes indicated by the instruction received by the receiver from the person.

With this configuration, the person whose wakefulness is to be induced operates an input device to cause the wakefulness inducing device to control the air conditioner under desired operating conditions. In addition, the wakefulness inducing device controls the air conditioner under the operating conditions according to the user's preference to induce the user's wakefulness. Accordingly, such a configuration allows for appropriate induction of the wakefulness of people in accordance with individual preferences.

For example, the wakefulness inducing device may further include an awakeness level obtainer that obtains a level of awakeness of the person. The controller may determine whether or not the person's level of awakeness obtained by the awakeness level obtainer meets a predetermined criterion, and may start controlling the air conditioner, if the person's level of awakeness obtained by the awakeness level obtainer meets the predetermined criterion.

With this configuration, the wakefulness inducing device starts controlling the air conditioner for a person, who is considered to require induction of the wakefulness, at an appropriate timing. Accordingly, the wakefulness inducing device according to the aspect of the present disclosure induces the person's wakefulness at an appropriate timing.

For example, the wakefulness inducing device may further include a determiner that determines a level of ease of awakening of the person. The controller may control the air conditioner based on a result of determination by the determiner.

With this configuration, the wakefulness inducing device controls the air conditioner under the operating conditions according to the person's ease of awakening. Accordingly, the wakefulness inducing device easily induces the person's wakefulness.

For example, the wakefulness inducing device may further include: an identification information obtainer that obtains identification information for identifying the person; and a memory that stores the person's level of ease of awakening in association with the person. The controller may cause the memory to store the person's level of ease of awakening obtained by the awakeness level obtainer in association with the person indicated by the identification information obtained by the identification information obtainer.

With this configuration, the wakefulness inducing device stores the ease of awakening for each person whose wakefulness is to be induced. The wakefulness inducing system stores individual information, and controls the air conditioner based on the stored information. The individual information includes the information that some target people are easily awaken by controlling the air flow temperature to be high, while other target people are easily awaken by controlling the air flow speed to be high. With this configuration, the wakefulness inducing device according to the aspect of the present disclosure appropriately controls the air conditioner in accordance with people whose wakefulness is to be induced.

For example, the controller may further control an environmental condition control device that controls an environmental condition around the person. The environmental condition around the person may be at least one of an illuminance of environmental light around the person, a color temperature of the environmental light, an oxygen concentration around the person, a carbon dioxide concentration around the person, music provided for the person, vibration applied to the person, an opening/closing state of a window located near the person, or an opening/closing state of a curtain located near the person. While controlling the air conditioner based on the person's heat dissipation intensity obtained by the heat dissipation intensity obtainer, the controller may further control the environmental condition control device to alternate the person's heat dissipation intensity.

Such a configuration allows for control of not only the air conditions, but also, for example, the illuminance and color temperature of the environmental light around the user, thereby awakening the user in a short time at low energy consumption. This configuration further allows for control of the oxygen concentration, carbon dioxide concentration, sound, and vibration around the user, thereby more easily inducing the user's wakefulness.

For example, the wakefulness inducing device may further include an environmental information obtainer that obtains environmental information indicating the environmental condition around the person from at least one of a temperature sensor, a humidity sensor, an illuminance sensor, a color temperature sensor, an air flow speed sensor, an oxygen concentration sensor, a carbon dioxide concentration sensor, a vibration sensor, or a microphone. The controller may control the environmental condition control device based on the environmental information obtained by the environmental information obtainer.

With this configuration, the wakefulness inducing device controls the environmental condition control device based on the environmental condition around the person. Accordingly, the wakefulness inducing device changes, based on the environmental condition around the person, the environmental condition around the person so as to more easily awaken the person.

For example, the wakefulness inducing device may further include a feeling information obtainer that obtains feeling information indicating a feeling of the person. The controller may control the air conditioner based on the feeling information obtained by the feeling information obtainer.

With this simple configuration, the wakefulness inducing device controls the air conditioner under the operating conditions desired by the person whose wakefulness is to be induced. Such a configuration allows for determination on, for example, whether or not the control of the environmental condition, which has been performed to awaken the person, is uncomfortable for the person. Upon determination that the control is uncomfortable, the configuration performs control to stop the control.

The wakefulness inducing system according to an aspect of the present disclosure includes the wakefulness inducing device, the heat dissipation intensity sensor, and the air conditioner.

With this configuration, the wakefulness inducing system controls the air conditioner based on the heat dissipation intensity of the person whose wakefulness is to be induced, and thus controls air conditions in view of the personal differences among people whose wakefulness is to be induced. Accordingly, the wakefulness inducing system according to the aspect of the present disclosure appropriately induces the wakefulness of people in accordance with the individuals.

For example, the heat dissipation intensity sensor may include a thermal image sensor.

Such a configuration allows for simple and highly accurate detection of the person's heat dissipation intensity. Accordingly, such a configuration allows for accurate detection of a change in the person's heat dissipation intensity, and thus controls the air conditioner at a more effective timing to change the user's heat dissipation intensity.

Now, exemplary embodiments of the present disclosure will be described with reference to the drawings. Each of the exemplary embodiments described below shows a general or specific example of the present disclosure. The numerical values, the constituent elements, the arrangement and connection of the constituent elements, the processes (steps), the process sequences and the like shown in the following exemplary embodiments are thus mere examples and not intended to limit the scope of the present disclosure. Among the constituent elements in the following exemplary embodiments, those not recited in any of the independent claims defining the most generic part of the present disclosure are described as freely selected constituent elements.

The drawings are schematic views and not always precisely drawn. In the drawings, scales are not always consistent. In the drawings, the same reference marks are used to represent equivalent elements, and the duplicated explanation may be omitted or simplified.

In the description, there are expressions such as a reference value "or higher," a reference value "or lower," and "lower than or equal to" a reference value, which are not used in a strict sense. For example, the expression of a "reference value or higher" may also mean that the value is larger than the reference value. When the "reference value or higher" is described in comparison with "lower than" the reference value, it means that the values are distinguished from each other across the reference value. The "reference value or higher" may also mean that the value is higher than the reference value, while "lower than the reference value" may also mean that the value is lower than or equal to the reference value.

Embodiment 1

Configuration

First, wakefulness inducing device 100 and wakefulness inducing system 200 according to Embodiment 1 will be described with reference to FIGS. 1 and 2.

FIG. 1 is a schematic view illustrating a system including wakefulness inducing device 100 according to Embodiment 1. Note that FIG. 1 illustrates wakefulness inducing device 100 according to Embodiment 1 and the inside of a vehicle, in which wakefulness inducing device 100 is disposed. FIG. 2 is a block diagram illustrating characteristic functional configurations of wakefulness inducing device 100 and wakefulness inducing system 200 according to Embodiment 1.

Wakefulness inducing device 100 is a control device that is disposed in, for example, a vehicle or an office, and communicatively connected to heat dissipation intensity sensor 210 and air conditioner 220 by wire or wireless. Wakefulness inducing device 100 obtains a person(user)'s heat dissipation intensity from heat dissipation intensity sensor 210, and controls air conditioner 220 based on the obtained user's heat dissipation intensity.

Figure 2:
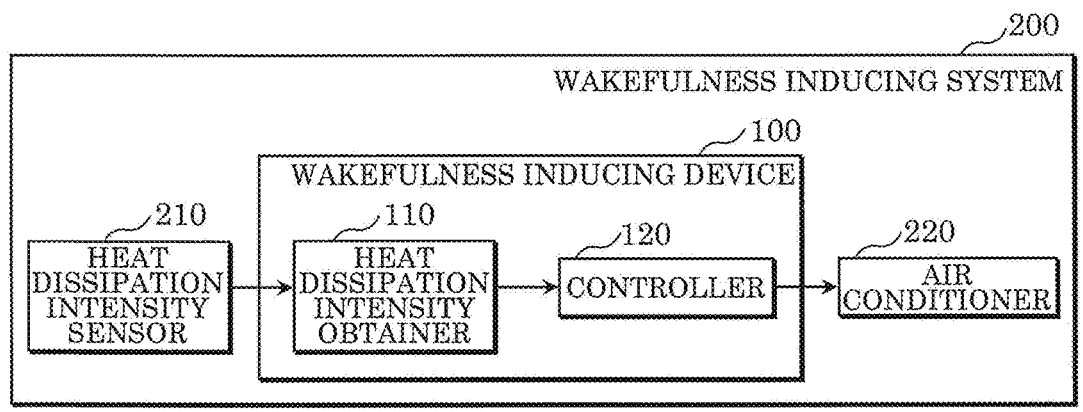
FIG. 2 is a block diagram illustrating characteristic functional configurations of the wakefulness inducing device and the wakefulness inducing system according to Embodiment 1.

As shown in FIG. 2, wakefulness inducing device 100 includes heat dissipation intensity obtainer 110 and controller 120.

Heat dissipation intensity obtainer 110 obtains, from heat dissipation intensity sensor 210, the heat dissipation intensity of the user whose wakefulness is to be induced. Specifically, heat dissipation intensity obtainer 110 includes an interface that is connected to heat dissipation intensity sensor 210 by wire or wireless. Heat dissipation intensity obtainer 110 obtains the user's heat dissipation intensity detected by heat dissipation intensity sensor 210, and outputs the obtained user's heat dissipation intensity to controller 120.

Controller 120 is a control device that controls air conditioner 220 to alternate the user's heat dissipation intensity based on the user's heat dissipation intensity obtained by heat dissipation intensity obtainer 110. Specifically, controller 120 is a control device that controls operating conditions such as the temperature, speed, direction, and amount of air flow of air conditioner 220 based on the user's heat dissipation intensity obtained by heat dissipation intensity obtainer 110. Controller 120 causes air conditioner 220 to repeatedly increases and decreases the user's heat dissipation intensity to alternate the user's heat dissipation intensity between a first heat dissipation intensity and a second heat dissipation intensity. The second heat dissipation intensity is lower than the first heat dissipation intensity. Specifically, controller 120 causes air conditioner 220 to change the surface temperature of the user including, for example, the skin and clothes and/or the temperatures of, for example, the air, walls, and floor around the user.

Controller 120 includes, for example, a central processing unit (CPU) and a memory that stores control programs executed by the CPU. Examples of the memory include a read only memory (ROM), a random-access memory (RAM), a hard disk drive (HDD), and a solid-state drive (SSD). Note that controller 120 may include, for example, an exclusive electronic circuit that executes the control programs as hardware.

Wakefulness inducing system 200 includes wakefulness inducing device 100, heat dissipation intensity sensor 210, and air conditioner 220.

Heat dissipation intensity sensor 210 is a sensor that detects the user's heat dissipation intensity. As long as detecting the heat dissipation intensity of the user whose wakefulness is to be induced, heat dissipation intensity sensor 210 may be disposed in contact with the user. For example, heat dissipation intensity sensor 210 may be a thermal imaging device including a thermal image sensor for taking thermal images. Examples of the thermal image sensor includes a bolometer and a thermopile sensor that measure far-infrared light.

Air conditioner 220 is an air conditioner that controls ambient air conditions around the user. Air conditioner 220 controls operating conditions (operating modes) such as the temperature, speed, direction, and amount of air flow, using controller 120 included in wakefulness inducing device 100. Air conditioner 220 changes then the ambient temperature around the user, and/or blows air to the user to alternate the user's heat dissipation intensity.

Operations

Now, operations of wakefulness inducing device 100 and wakefulness inducing system 200 according to Embodiment 1 will be described with reference to FIGS. 3 to 7.

Figure 3:
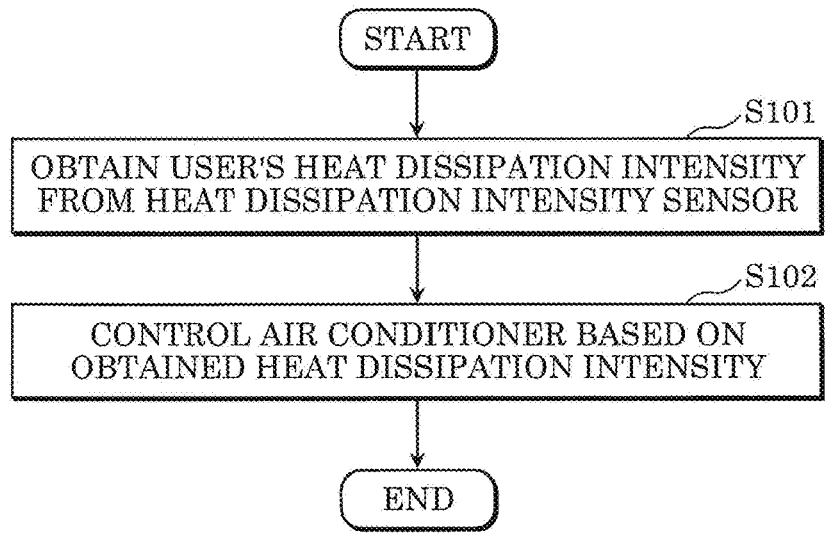
FIG. 3 is a flowchart for illustrating how the wakefulness inducing device according to Embodiment 1 controls an air conditioner.

FIG. 3 is a flowchart for illustrating operation procedures, how wakefulness inducing device 100 according to Embodiment 1 controls air conditioner 220.

First, heat dissipation intensity obtainer 110 obtains the user's heat dissipation intensity from heat dissipation intensity sensor 210 (step S102). For example, in step S101, heat dissipation intensity sensor 210 takes a thermal image of the user, and outputs the taken thermal image to heat dissipation intensity obtainer 110. Heat dissipation intensity obtainer 110 obtains the thermal image output by heat dissipation intensity sensor 210.

Next, controller 120 controls air conditioner 220 based on the user's heat dissipation intensity obtained by heat dissipation intensity obtainer 110 (step S102). For example, in step S102, controller 120 obtains the user's thermal image output by heat dissipation intensity obtainer 110, and calculates the user's heat dissipation intensity based on the obtained thermal image. Controller 120 controls air conditioner 220 based on the calculated user's heat dissipation intensity to change the user's heat dissipation intensity. Specifically, controller 120 determines operating conditions, such as the speed, direction, temperature, and amount of air flow, which are controlled by air conditioner 220, based on the user's heat dissipation intensity obtained from heat dissipation intensity obtainer 110. Controller 120 causes air conditioner 220 to execute the determined conditions. That is, wakefulness inducing device 100 repeatedly executes the obtention of the user's heat dissipation intensity and the control of air conditioner 220 to increase or decrease the user's heat dissipation intensity, thereby alternating the user's heat dissipation intensity.

Figure 4A:
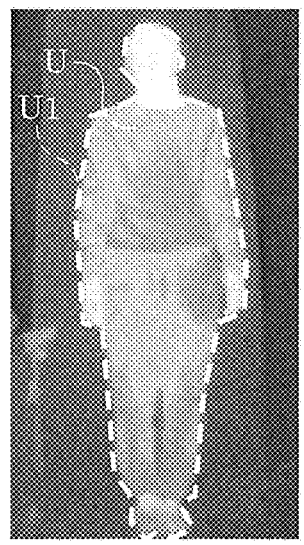
FIG. 4A illustrates an exemplary thermal image taken by a heat dissipation intensity sensor.
Figure 4B:
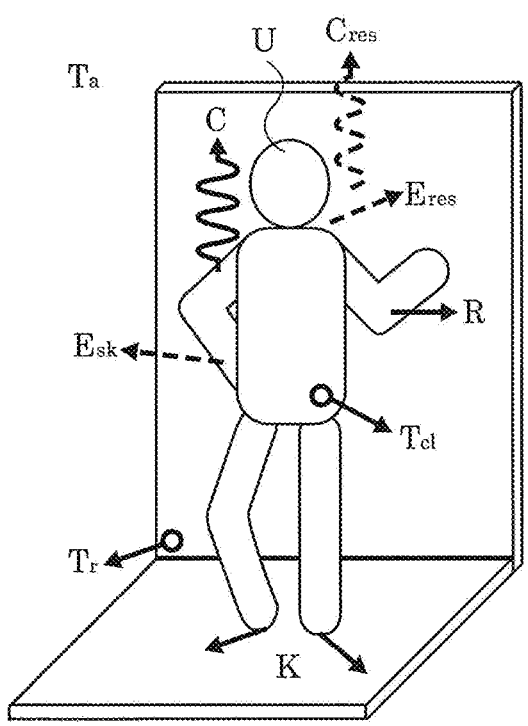
FIG. 4B illustrates a method of calculating a person's heat dissipation intensity.

FIG. 4A illustrates an exemplary thermal image taken by heat dissipation intensity sensor 210. FIG. 4B illustrates a method of calculating the heat dissipation intensity of user U. In FIG. 4A, whitish regions of the thermal image represent a high heat dissipation intensity of user U, while blackish regions represent a low heat dissipation intensity of user U.

In FIG. 4B, H (W/m$^2$), which represents the intensity of heat dissipated from user U, is expressed by the following equation (1).

$$H = R + C + K + E_{sk} + E_{res} + C_{res} \qquad (1)$$

Note that R represents the intensity of heat dissipation by radiation. C represents the intensity of heat dissipation by convection. K represents the intensity of heat dissipation by thermal conduction. $E_{sk}$ represents the intensity of heat dissipation by moisture evaporation from the skin. $E_{res}$ represents the intensity of heat dissipation by moisture evaporation of breath. $C_{res}$ represents the intensity of heat dissipation by convection of the breath. The unit for R, C, K, $E_{sk}$, $E_{res}$, and $C_{res}$ is W/m$^2$.

R and C are expressed by the following equations (2) and (3), respectively.

$$R = H_r \times (T_{cl} - T_r) \qquad (2)$$

$$C = H_c \times (T_{cl} - T_a) \qquad (3)$$

$T_{cl}$ (° C.) represents the surface temperature of user U including, for example, clothes and the skin. $T_r$ (° C.) represents the temperatures of, for example, the walls and floor around user U. $T_a$ (° C.) represents the temperature (air temperature) around user U. For example, $H_r$ representing the radiation heat conductivity is 4.65 (W/m$^2$·° C.), while $H_c$ representing the convection heat conductivity is 3.7 (W/m$^2$·° C.).

Assume that the contact area between user U and the floor or wall surfaces is so small that intensity K of heat dissipation by thermal conduction is negligible, user U is resting, and intensity $C_{res}$ of heat dissipation from the breath is negligibly low, and ambient temperature $T_a$ is equal to temperatures $T_r$ of the surrounding walls and floor. Then, equation (1) can be expressed with the following equation (4) using equations (2) and (3).

$$H=(H_r-H_c)\times(T_{cl}-T_r)+E_{sk}+E_{res} \quad (4)$$

If user U is here resting, intensities $E_{sk}$ and $E_{res}$ of heat dissipation by moisture evaporation are regarded as constant, for example, at a low air temperature, the variable of equation (4) is only $(T_{cl}-T_r)$. That is, while user U is resting, the heat dissipation intensity of user U is assumable based on the difference between the surface temperature of user U including, for example, the clothes and skin, and the temperatures of, for example, the floor and wall surfaces. Accordingly, if mean surface temperature $T_{cl}$ of user U and temperatures $T_r$ of, for example, the walls and floor around user U can be extracted from the thermal image taken by heat dissipation intensity sensor 210, the heat dissipation intensity of user U is assumable without any contact.

For example, in the case of the thermal image shown in FIG. 4A, where the mean surface temperature inside outline U1, which is surrounded by the dashed line, of user U is $T_{cl}$, and the mean temperature outside the dashed line is $T_r$; the heat dissipation intensity of user U can be calculated.

Note that heat dissipation intensity sensor 210 may also measure the intensity of heat dissipation by convection to improve the accuracy in measuring the heat dissipation intensity of user U. Since the intensity of heat dissipation by convection is affected by the air flow speed, wakefulness inducing system 200 may further include a device that measures the air flow speed around user U. Heat dissipation intensity sensor 210 may also measure the intensity of heat dissipation by moisture evaporation from, for example, the skin and breath to improve the accuracy in measuring the heat dissipation intensity of user U. Since the intensity of heat dissipation by moisture evaporation is affected by the humidity, wakefulness inducing system 200 may further include a humidity sensor that measures the humidity.

Figure 5:
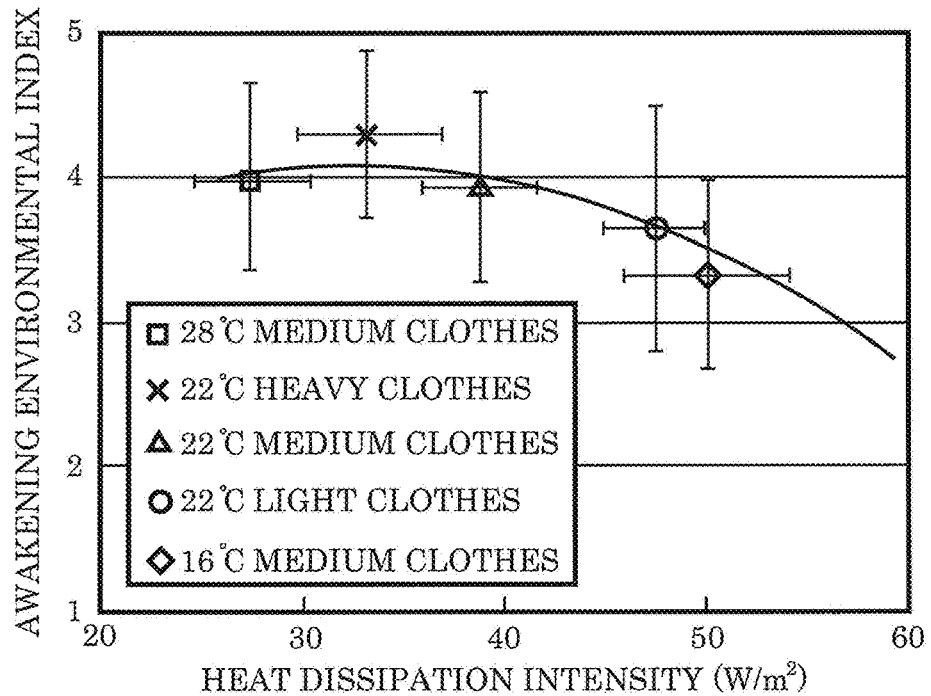
FIG. 5 illustrates an awakening environmental index relative to the person's heat dissipation intensity.

FIG. 5 illustrates an awakening environmental index relative to the heat dissipation intensity of user U. The awakening environmental index indicates the user's level of ease of awakening. Specifically, the greater the awakening environmental index is, the less the user's environment induces the wakefulness. In other words, the greater the awakening environmental index is, the more the user feels the user's environment comfortable. Among measurement points, the air temperature and the amount of user's clothes are different. Specifically, FIG. 5 illustrates three stages: heavy clothes; light clothes; and medium clothes between the light and heavy clothes.

As shown in FIG. 5, with a decrease in the user's heat dissipation intensity from 25 (W/m$^2$), the awakening environmental index decreases and the user tends to feel the user's environment uncomfortable. With an increase in the user's heat dissipation intensity from 45 (W/m$^2$), the awakening environmental index decreases and the user tends to feel the user's environment uncomfortable. On the other hand, if the user's heat dissipation intensity falls within a range from 25 (W/m$^2$) to 45 (W/m$^2$), the user tends to feel the user's environment comfortable. Therefore, controller 120 controls air conditioner 220 so that the user's heat dissipation intensity falls within a range from 25 (W/m$^2$) to 45 (W/m$^2$). This configuration allows for easier induction of the user's wakefulness without making the user uncomfortable. If the user's heat dissipation intensity falls within a range from 40 (W/m$^2$) to 45 (W/m$^2$), the user's wakefulness is easily induced without making the user uncomfortable.

Figure 6A:
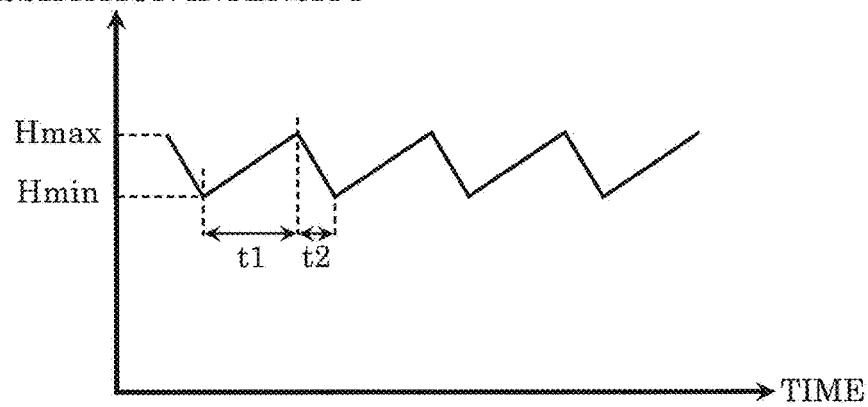
FIG. 6A illustrates a first example of the person's heat dissipation intensity relative to the time controlled by the wakefulness inducing device according to Embodiment 1.

FIG. 6A illustrates a first example of the user's heat dissipation intensity relative to the time controlled by wakefulness inducing device 100 according to Embodiment 1. Specifically, FIG. 6A is a graph illustrating the user's heat dissipation intensity relative to the time, if wakefulness inducing device 100 controls air conditioner 220 to change the user's heat dissipation intensity.

For example, to increase the user's heat dissipation intensity, controller 120 causes air conditioner 220 to blow, to the user, air with a temperature lower than or equal to the temperature around the user. On the other hand, to decrease the user's heat dissipation intensity, controller 120 causes air conditioner 220 to blow, to the user, air with a temperature higher than the temperature around the user. With this configuration, for example, controller 120 alternates the user's heat dissipation intensity so that the heat dissipation intensity changes as indicated by the graph in FIG. 6A. Specifically, controller 120 controls air conditioner 220 to alternate the user's heat dissipation intensity between first heat dissipation intensity (e.g., the maximum heat dissipation intensity) Hmax and second heat dissipation intensity (e.g., the minimum heat dissipation intensity) Hmin. Second heat dissipation intensity Hmin is lower than first heat dissipation intensity Hmax.

For example, controller 120 may alternates the user's heat dissipation intensity by controlling air conditioner 220 based on the user's heat dissipation intensity obtained by heat dissipation intensity obtainer 110 to set first time period t1 longer than second time period t2. In first time period t1, the user's heat dissipation intensity increases from second heat dissipation intensity Hmin to first heat dissipation intensity Hmax. In second time period t2, the user's heat dissipation intensity decreases from first heat dissipation intensity Hmax to second heat dissipation intensity Hmin. It is known that the lower the temperature (air temperature) around the person is, the more easily the person wakes up. Accordingly, the user's wakefulness is easily induced by setting first time period t1, in which the ambient temperature around the user decreases, longer than second time period t2, in which the ambient temperature around the user increases.

Assume that a user uses wakefulness inducing device 100 at a high air temperature, for example, in summer. Then, controller 120 controls air conditioner 220 to blow, for example, cold air with a temperature lower than the air temperature to the user, thereby only decreasing the user's surface temperature (in other words, increasing the user's heat dissipation intensity). No control is needed to increase the user's surface temperature (in other words, decrease the user's heat dissipation intensity). In this case, it is considered that the user's surface temperature automatically increases (in other words, the user's heat dissipation intensity automatically decreases), when air conditioner 220 stops operating. Accordingly, controller 120 causes air conditioner 220 to execute the control to decrease the user's surface temperature, thereby reducing the energy consumed by air conditioner 220 (i.e., saving the energy).

Assume that a user uses wakefulness inducing device 100 at a low air temperature, for example, in winter. Controller 120 controls air conditioner 220 to blow, for example, warm air with a temperature higher than the air temperature to the user, thereby only increasing the user's surface temperature (in other words, decreasing the user's heat dissipation intensity). No control is needed to decrease the user's surface temperature (in other words, increase the user's heat dissipation intensity).

Figure 6B:
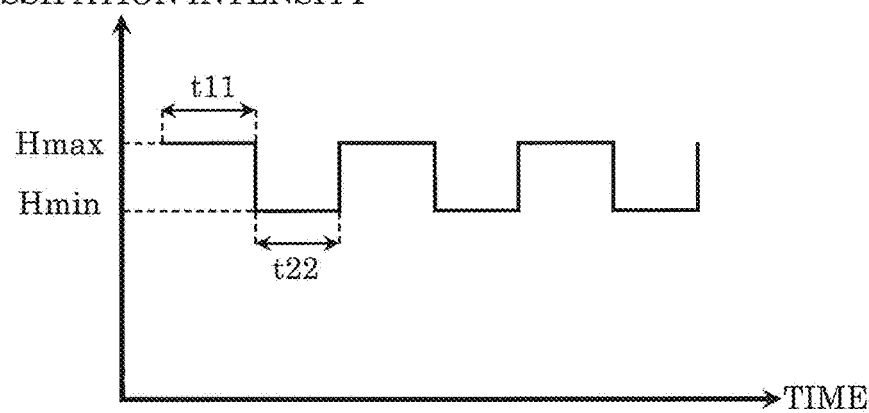
FIG. 6B illustrates a second example of the person's heat dissipation intensity relative to the time controlled by the wakefulness inducing device according to Embodiment 1.

FIG. 6B illustrates a second example of the user's heat dissipation intensity relative to the time controlled by wakefulness inducing device 100 according to Embodiment 1.

As shown in FIG. 6B, controller 120 may alternate the user's heat dissipation intensity by controlling air conditioner 220 based on the user's heat dissipation intensity obtained by heat dissipation intensity obtainer 110 to set first time period t11 longer than second time period t22. In first time period t11, the user's heat dissipation intensity remains at first heat dissipation intensity Hmax. In second time period t22, the user's heat dissipation intensity remains at second heat dissipation intensity Hmin.

As described above, it is known that the lower the temperature (air temperature) around the person is, the more easily the person wakes up. Accordingly, the user's wakefulness is easily induced by setting first time period t11, in which the ambient temperature around the user is relatively low, longer than second time period t22, in which the ambient temperature around the user is relatively high.

Note that, for example, in order to perform control to change the user's heat dissipation intensity, controller 120 may perform control to gradually change the user's heat dissipation intensity as indicated by first time period t1 of FIG. 6A and to rapidly decrease the user's heat dissipation intensity as indicated by second time period t22 of FIG. 6B, thereby controlling the user's heat dissipation intensity to remain at second heat dissipation intensity Hmin.

That is, controller 120 alternates the user's heat dissipation intensity by controlling air conditioner 220 based on the user's heat dissipation intensity obtained by heat dissipation intensity obtainer 110 to set first time period t1 longer than second time period t2, or to set first time period t11 longer than second time period t22. In first time period t1, the user's heat dissipation intensity increases from second heat dissipation intensity Hmin to first heat dissipation intensity Hmax. In first time period t11, the user's heat dissipation intensity remains at first heat dissipation intensity Hmax. In second time period t2, the user's heat dissipation intensity decreases from first heat dissipation intensity Hmax to second heat dissipation intensity Hmin. In second time period t22, the user's heat dissipation intensity remains at second heat dissipation intensity Hmin.

The time periods set as first time periods t1 and t11 and second time periods t2 and t22 in advance are, for example, about several minutes, but not limited thereto.

Controller 120 may control air conditioner 220 to change the heat dissipation intensity of not the whole body but the hands, feet, and other body regions of the user.

Figure 6C:
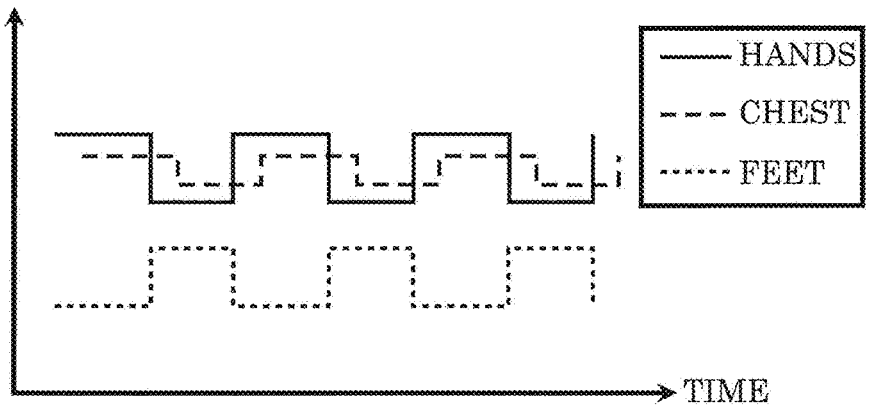
FIG. 6C illustrates a third example of the person's heat dissipation intensity relative to the time controlled by the wakefulness inducing device according to Embodiment 1.

FIG. 6C illustrates a third example of the user's heat dissipation intensity relative to the time controlled by wakefulness inducing device 100 according to Embodiment 1.

As shown in FIG. 6C, if air conditioner 220 is controlled for the user to change the user's heat dissipation intensity, it is assumed that the heat dissipation intensities may be different among the user's body regions such as hands, chest, and feet. In this case, the heat dissipation intensity of a region such as the chest may be employed as the user's heat dissipation intensity. Alternatively, the mean value of the heat dissipation intensities of all body regions of the user, which are obtainable by heat dissipation intensity obtainer 110, may be employed as the user's heat dissipation intensity.

Controller 120 may control air conditioner 220 based on not only the heat dissipation intensity of the whole body, which is obtained from the difference between the mean temperature of the user's whole body and the temperature around the user, but also the heat dissipation intensity of each user's body region. Examples of the heat dissipation intensity of each user's body region include the heat dissipation intensity of the arms, which is obtained from the difference between the mean temperature of the user's arms and the temperature around the user. Examples also include the heat dissipation intensity of the lower legs, which is obtained from the difference between the mean temperature of the user's legs and the temperature around the user. It is known that the user feels comfortable with a decrease in the variation range of the heat dissipation intensity of, for example, the chest, which is near the trunk, as compared to that of, for example, the hands or feet. Therefore, controller 120 may control, for example, the sound, speed, direction, and amount of air to be blown to each body region such as the feet, head, and hands by air conditioner 220 so that the heat dissipation intensity of the user's body region is suitable to induce the wakefulness.

Controller 120 may control air conditioner 220 so that the user's heat dissipation intensities are different among the user's body regions. An increase in the heat dissipation intensity of, for example, the hands and feet, allows for induction of the wakefulness. However, a continuous increase in the heat dissipation intensity decreases the temperatures of, for example, the hands and feet, and may make the user uncomfortable. Thus, controller 120 causes air conditioner 220 to alternately increase, for example, the heat dissipation intensities of the user's right foot and left foot, thereby inducing the wakefulness without making the user uncomfortable.

Wakefulness inducing device 100 and wakefulness inducing system 200 are used, for example, in an office or a vehicle. If heat dissipation intensity sensor 210 is a thermal image sensor, heat dissipation intensity sensor 210 may be fixed to a part of a building material or a vehicle, or may be movable to change the imaging range, FIG. 7 illustrates how heat dissipation intensity sensor 210 takes a thermal image.

Figure 7:
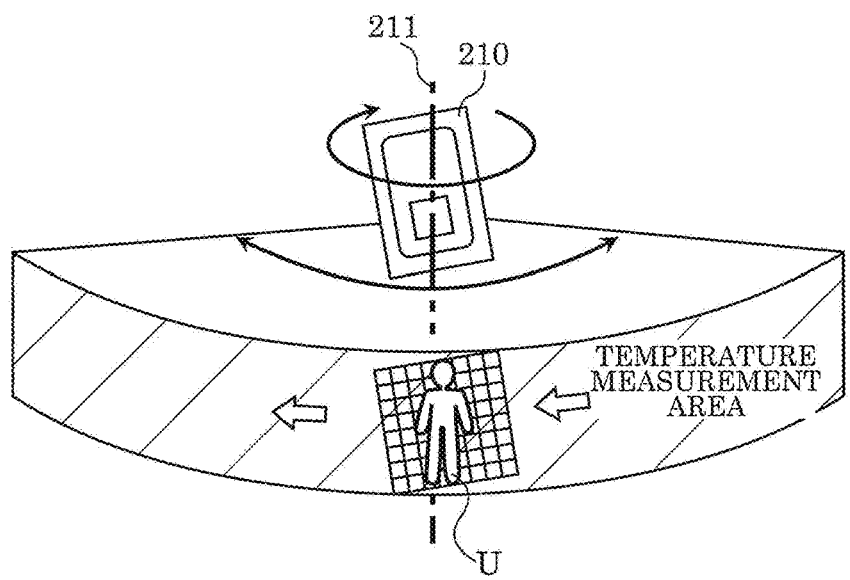
FIG. 7 illustrates an example, how the heat dissipation intensity sensor takes a thermal image.

As shown in FIG. 7, for example, heat dissipation intensity sensor 210 may be fixed to, for example, a vehicle or a building material rotatably about axis 211. For example, heat dissipation intensity sensor 210 may be fixed to, for example, a rotatable motor, thereby being rotatable about axis 211. In this case, for example, a motor only needs to be fixed to, for example, a vehicle or a building material. This configuration causes a single heat dissipation intensity sensor 210 to detect the heat dissipation intensity in a wide range (the temperature measurement area hatched in FIG. 7). For example, any one of a thermal imaging device that includes heat dissipation intensity sensor 210, heat dissipation intensity obtainer 110, or controller 120 detects user U from a thermal image detected by heat dissipation intensity sensor 210 by a known method to calculate the heat dissipation intensity of user U. This configuration allows for measurement of the heat dissipation intensity of user U, as long as user U is within the temperature measurement area. Thus, if user U may move within, for example, an office, wakefulness inducing device 100 and wakefulness inducing system 200 easily obtain the heat dissipation intensity of user U.

A rotatable heat dissipation intensity sensor 210 allows for detection of a wide range of the heat dissipation intensity. If, for example, the heat dissipation intensities of a plurality of users need to be changed, the single heat dissipation intensity sensor 210 easily detects the heat dissipation intensities of the users. Accordingly, the wakefulness can be inducted by controlling the air conditions in a manner suitable for the respective users. Since the user and the ambient environment are measured with the same pixels, the difference between the user's temperature and the ambient temperature can be measured at high accuracy without being affected by the temperature difference between the pixels. This allows for high accuracy measurement of the heat dissipation intensity.

Advantageous Effects, Etc

As described above, wakefulness inducing device 100 includes heat dissipation intensity obtainer 110 and controller 120. Heat dissipation intensity obtainer 110 obtains the user's heat dissipation intensity from heat dissipation intensity sensor 210. Controller 120 controls air conditioner 220 to alternate the user's heat dissipation intensity between first, heat dissipation intensity Hmax and second heat dissipation intensity Hmin lower than first heat dissipation intensity Hmax. Controller 120 alternates the user's heat dissipation intensity by controlling air conditioner 220 based on the user's heat dissipation intensity obtained by heat dissipation intensity obtainer 110 to set first time period t1 longer than second time period t2, or to set first time period t11 longer than second time period t22. In first time period t1, the user's heat dissipation intensity increases from second heat dissipation intensity Hmin to first heat dissipation intensity Hmax. In first time period t11, the user's heat dissipation intensity remains at first heat dissipation intensity Hmax. In second time period t2, the user's heat dissipation intensity decreases from first heat dissipation intensity Hmax to second heat dissipation intensity Hmin. In second time period t22, the user's heat dissipation intensity remains at second heat dissipation intensity Hmin.

This configuration causes wakefulness inducing device 100 to control air conditioner 220 based on the state of heat dissipation of the user whose wakefulness is to be induced. That is, wakefulness inducing device 100 controls air conditions in view of personal differences among users whose wakefulness is to be induced. Accordingly, wakefulness inducing device 100 according to the aspect of the present disclosure appropriately induces the wakefulness of the users in accordance with the individuals.

For example, first heat dissipation intensity Hmax may be 45 $W/m^2$ or lower, while second heat dissipation intensity Hmin may be 25 $W/m^2$ or higher.

With this configuration, wakefulness inducing device 100 reduces discomfort, caused in controlling air conditioner 220, of the user whose wakefulness is to be induced. Accordingly, wakefulness inducing device 100 according to the aspect of the present disclosure reduces the discomfort, and appropriately induces the wakefulness of the users in accordance with the individuals.

For example, to increase the user's heat dissipation intensity, controller 120 may cause air conditioner 220 to blow, to the user, air with a temperature lower than or equal to the temperature around the user.

This configuration simply and easily increases the user's heat dissipation intensity.

For example, to decrease the user's heat dissipation intensity, controller 120 may cause air conditioner 220 to blow, to the user, air with a temperature higher than the temperature around the user.

This configuration simply and easily decreases the user's heat dissipation intensity.

Wakefulness inducing system 200 includes wakefulness inducing device 100, heat dissipation intensity sensor 210, and air conditioner 220.

With this configuration, wakefulness inducing system 200 controls air conditioner 220 based on the heat dissipation intensity of the user whose wakefulness is to be induced. The air conditions can be thus controlled in view of personal differences among users whose wakefulness is to be induced. Accordingly, wakefulness inducing system 200 appropriately induces the wakefulness of the users in accordance with the individuals.

For example, heat dissipation intensity sensor 210 may include a thermal image sensor.

Such a configuration allows for simple and highly accurate detection of the user's heat dissipation intensity. Accordingly, such a configuration allows for accurate detection of a change in the user's heat dissipation intensity, and thus controls air conditioner 220 at a more effective timing to change the user's heat dissipation intensity. In addition, such a configuration allows for simple detection of the user's heat dissipation intensity without requiring any user's labor such as wearing heat dissipation intensity sensor 210.

Embodiment 2

Now, a wakefulness inducing device and a wakefulness inducing system according to Embodiment 2 will be described. The same reference marks as those of Embodiment 1 are used to represent equivalent elements, and the detailed explanation thereof may be omitted or simplified.

Configurations

Configurations of wakefulness inducing device 100a and wakefulness inducing system 200a according to Embodiment 2 will be described with reference to FIG. 8.

Figure 8:
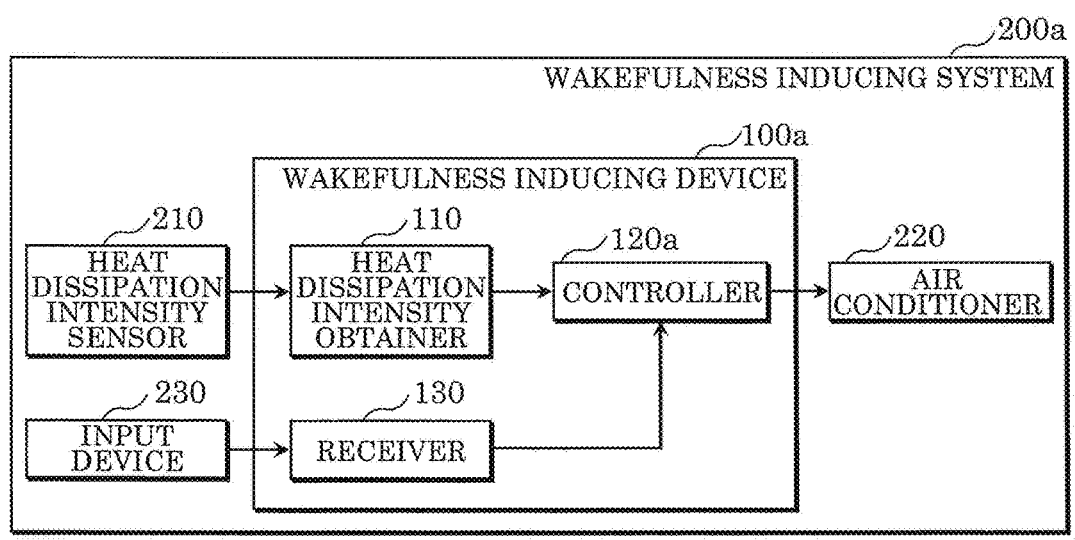
FIG. 8 is a block diagram illustrating characteristic functional configurations of a wakefulness inducing device and a wakefulness inducing system according to Embodiment 2.

FIG. 8 is a block diagram illustrating characteristic functional configurations of wakefulness inducing device 100a and wakefulness inducing system 200a according to Embodiment 2.

As shown in FIG. 8, wakefulness inducing device 100a includes receiver 130 in addition to the configuration of wakefulness inducing device 100. Wakefulness inducing system 200a includes wakefulness inducing device 100a, heat dissipation intensity sensor 210, air conditioner 220, and input device 230.

Input device 230 is a user interface for inputting the operating conditions (operating modes) of air conditioner 220, which are desired by a user. Input device 230 is, for example, a touch panel, a keyboard, or buttons. As long as sending, to receiver 130, instructions input by the user; input device 230 may be a wireless device such as a remote controller or a smartphone.

Receiver 130 is an interface that receives user's instructions input to input device 230. As long as receiving instructions that the user has input to input device 230, receiver 130 may be connected to input device 230 by wire or may be communicatively connected to input device 230 by wireless.

Controller 120a is a control device that controls the temperature, speed, direction, and amount of air flow of air conditioner 220 based on the user's heat dissipation intensity obtained by heat dissipation intensity obtainer 110, thereby repeatedly increasing and decreasing the user's heat dissipation intensity. Controller 120a includes, for example, a CPU and a memory that stores control programs executed by the CPU. Note that controller 120a may include, for example, an exclusive electronic circuit that executes the control programs as hardware.

Controller 120a changes the operating modes, which are operating conditions such as the temperature, speed, direction, and amount of air flow of air conditioner 220, based on the information received by receiver 130.

Specifically, controller 120a controls air conditioner 220 to selectively execute a plurality of operating modes so that values of at least one of first heat dissipation intensity Hmax, second heat dissipation intensity Hmin, first time period t1 or t11, or second time period t2 or t22, which is indicated by FIG. 6A or 6B, are different among the operating modes. More specifically, controller 120a controls air conditioner 220 to selectively execute the plurality of operating modes so that values of the speed, direction, temperature, and amount of air flow, which are controlled by air conditioner 220, are different among the operating modes.

Receiver 130 receives, from a user, an instruction indicating one of the plurality of operating modes. Specifically, receiver 130 receives instructions that the user has input to input device 230.

Controller 120a controls air conditioner 220 to execute the one of the operating modes indicated by the instruction received by receiver 130 from the user.

Operations

Now, operations of wakefulness inducing device 100a and wakefulness inducing system 200a according to Embodiment 2 will be described with reference to FIG. 9.

Figure 9:
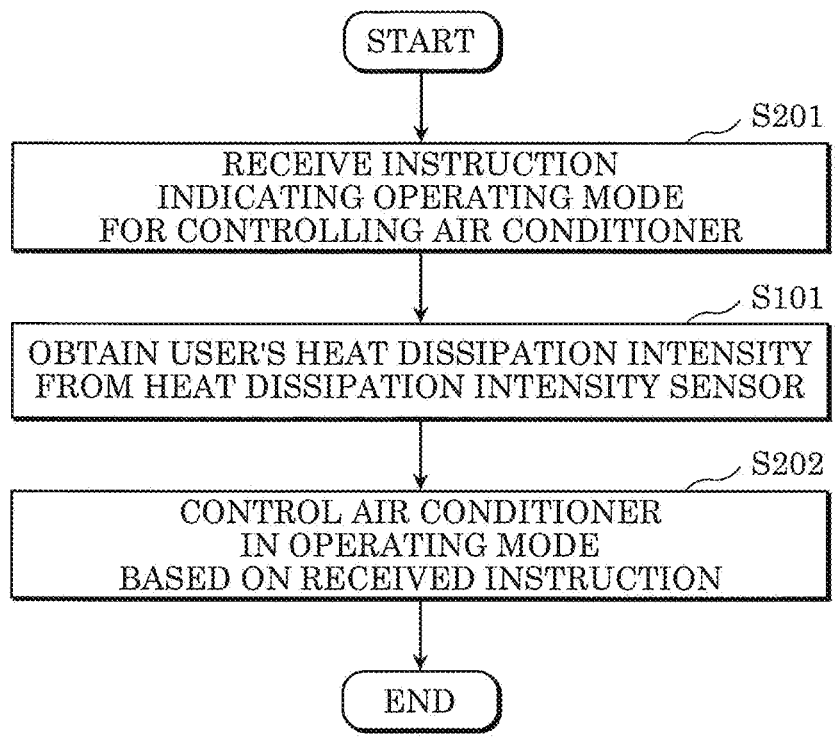
FIG. 9 is a flowchart for illustrating how the wakefulness inducing device according to Embodiment 2 controls the air conditioner.

FIG. 9 is a flowchart for illustrating operation procedures, how wakefulness inducing device 100a according to Embodiment 2 controls air conditioner 220.

First, receiver 130 receives, from a user, an instruction indicating one of the operating modes, in which controller 120a controls air conditioner 220s (step S201). Specifically, in step S201, receiver 130 receives information including an instruction that the user has input to input device 230.

Next, heat dissipation intensity obtainer 110 obtains the user's heat dissipation intensity from heat dissipation intensity sensor 210 (step S101).

Then, controller 120a controls air conditioner 220 based on the user's instruction received by receiver 130, and the user's heat dissipation intensity obtained by heat dissipation intensity obtainer 110 (step S202). For example, in step S202, controller 120a obtains the user's thermal image output by heat dissipation intensity obtainer 110, and calculates the user's heat dissipation intensity based on the obtained thermal image. Controller 120a controls air conditioner 220 based on the calculated user's heat dissipation intensity to alternate the user's heat dissipation intensity. With this configuration, controller 120a controls air conditioner 220 under the operating conditions according to user's preference.

While an example has been described in FIG. 9 where step S201 is executed before step S101, the order of steps is not limited thereto. For example, while controller 120a controls air conditioner 220, receiver 130 may receive an instruction from the user. In this case, controller 120a may change the operating modes of air conditioner 220 in accordance with the received instruction.

Advantageous Effects, Etc

As described above, controller 120a included in wakefulness inducing device 100a according to Embodiment 2 controls air conditioner 220 to selectively execute a plurality of operating modes. Among the operating modes, values of at least one of first heat dissipation intensity Hmax, second heat dissipation intensity Hmin, first time period t1 (or first time period t11), or second time period t2 (or second time period t22) are different. Wakefulness inducing device 100a further includes receiver 130 that receives, from the user, an instruction indicating one of the plurality of operating modes. Controller 120a controls air conditioner 220 to execute the one of the operating modes indicated by the instruction received by receiver 130 from the user.

With this configuration, the user whose wakefulness is to be induced operates input device 230 to cause wakefulness inducing device 100a to control air conditioner 220 under the operating conditions desired by the user. In addition, wakefulness inducing device 100a induces the user's wakefulness under the operating conditions of air conditioner 220 according to the user's preference. Accordingly, such a configuration allows for appropriate induction of the wakefulness of users in accordance with individual preferences. It is assumed that each user has a demand such as earlier awakening, lower power consumption, and awakening while keeping a comfortable state. Receiver 130 receives such demands of the users via input device 230, whereby controller 120a controls air conditioner 220 under operating conditions closer to the preferences of the users.

Embodiment 3

Now, a wakefulness inducing device and a wakefulness inducing system according to Embodiment 3 will be described. The same reference marks as those of Embodiments 1 and 2 are used to represent equivalent elements, and the detailed explanation thereof may be omitted or simplified.

Configurations

Configurations of wakefulness inducing device 100b and wakefulness inducing system 200b according to Embodiment 3 will be described with reference to FIG. 10.

Figure 10:
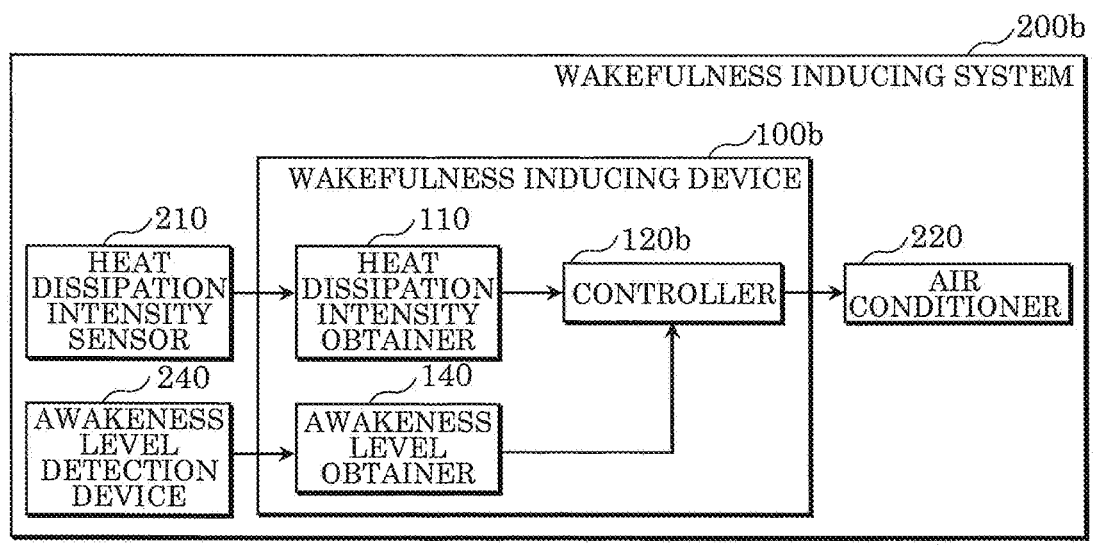
FIG. 10 is a block diagram illustrating characteristic functional configurations of a wakefulness inducing device and a wakefulness inducing system according to Embodiment 3.

FIG. 10 is a block diagram illustrating characteristic functional configurations of wakefulness inducing device 100b and wakefulness inducing system 200b according to Embodiment 3.

As shown in FIG. 10, wakefulness inducing device 100b includes awakeness level obtainer 140 in addition to the configuration of wakefulness inducing device 100. Wakefulness inducing system 200b includes wakefulness inducing device 100b, heat dissipation intensity sensor 210, air conditioner 220, and awakeness level detection device 240.

Awakeness level detection device 240 is a device that detects the level (degree) of the user's awakeness. As long as detecting the user's level of awakeness, awakeness level detection device 240 is, for example, a camera. Awakeness level detection device 240 sends information indicating the user's level of awakeness to awakeness level obtainer 140. If awakeness level detection device 240 is a camera; awakeness level detection device 240 sends, to awakeness level obtainer 140, for example, an image indicating the user's face as the information indicating the user's level of awakeness.

Awakeness level obtainer 140 is an interface for obtaining the information, which has been sent from awakeness level detection device 240 and indicates the user's level of awakeness. As long as receiving the information, which has been sent from awakeness level detection device 240 and indicates the user's level of awakeness; awakeness level obtainer 140 may be connected to awakeness level detection device 240 by wire, or may be communicatively connected to awakeness level detection device 240 by wireless.

Controller 120b is a control device that controls the temperature, speed, direction, and amount of air flow of air conditioner 220 based on the user's heat dissipation intensity obtained by heat dissipation intensity obtainer 110, thereby repeatedly increasing and decreasing the user's heat dissipation intensity. Controller 120b includes, for example, a CPU and a memory that stores control programs executed by the CPU. Note that controller 120b may include, for example, an exclusive electronic circuit that executes the control programs as hardware.

Controller 120b determines whether or not the user's level of awakeness obtained by awakeness level obtainer 140 meets a predetermined criterion, and starts controlling air conditioner 220, if the user's level of awakeness obtained by awakeness level obtainer 140 meets the predetermined criterion.

The predetermined criterion is here the user's level of awakeness determined in advance. For example, controller 120b detects the blink period of user U from images (e.g., a movie) repeatedly obtained by awakeness level obtainer 140. For example, controller 120b determines that the awakeness level is high, for example, 5, if the user's blink period is stable, and determines that the awakeness level is low, for example, 3, if user U blinks late and frequently in a short period. In this manner, controller 120b evaluates the user's level of awakeness in five stages from 1 to 5 based on, for example, the images (e.g., the movie) of the user's face. Upon determination that the awakeness level is 3 or higher, where the reference value determined as the predetermined criterion in advance is 3, controller 120b starts controlling air conditioner 220.

These is no need to evaluate the awakeness level in five stages. The awakeness level may be evaluated in six stages or higher, or four stages or lower. There is also no need for controller 120b to execute the evaluation of the awakeness level. For example, awakeness level detection device 240 may execute the evaluation. In this case, awakeness level detection device 240 may send, to awakeness level obtainer 140, only the information indicating the value of the user's level of awakeness. Alternatively, for example, awakeness level obtainer 140 may execute the evaluation. In this case, awakeness level obtainer 140 may further include a CPU and a memory. The CPU is for executing control programs for calculating the value of the awakeness level evaluated based on the information, which has been sent from awakeness level detection device 240 and indicates the user's level of awakeness. The memory stores the control programs. In the following description, awakeness level detection device 240 takes the user's image (e.g., a moving image), and sends, to awakeness level obtainer 140, the moving image as the information indicating the user's level of awakeness. Awakeness level obtainer 140 calculates the user's level of awakeness from the moving image.

Operations

Now, operations of wakefulness inducing device 100b and wakefulness inducing system 200b according to Embodiment 3 will be described with reference to FIG. 11.

Figure 11:
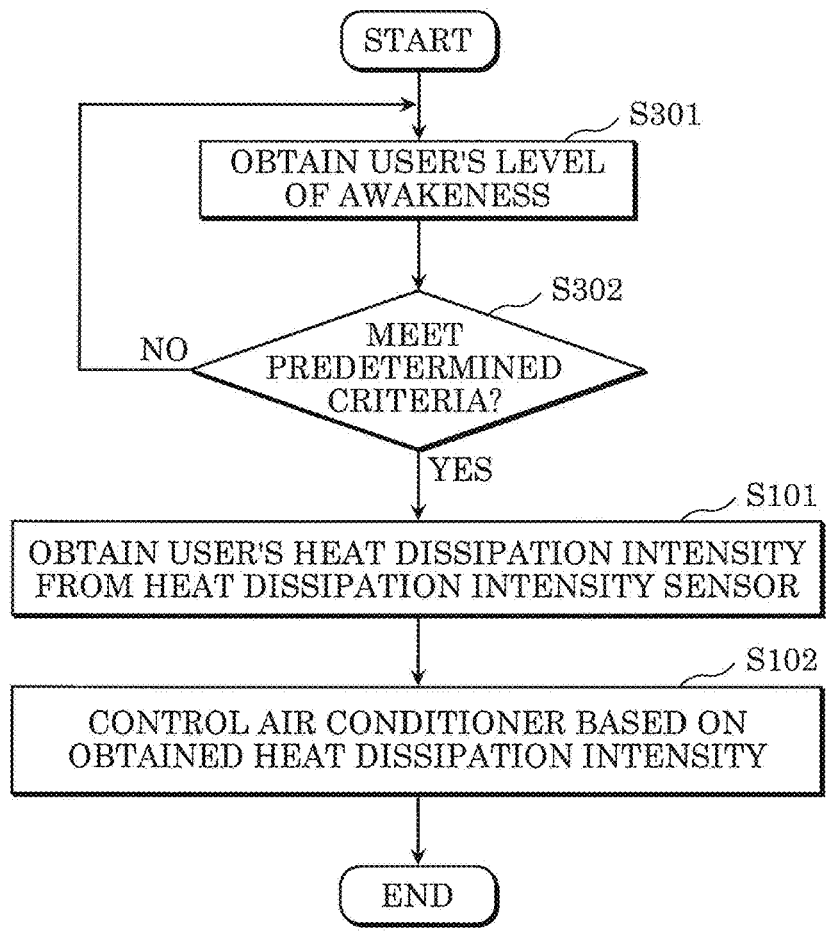
FIG. 11 is a flowchart for illustrating how the wakefulness inducing device according to Embodiment 3 controls the air conditioner.

FIG. 11 is a flowchart for illustrating operation procedures, how wakefulness inducing device 100b according to Embodiment 3 controls air conditioner 220.

Awakeness level obtainer 140 obtains the user's level of awakeness (step S301). In step S301, for example, awakeness level obtainer 140 obtains the moving image took by awakeness level detection device 240 and analyzes the obtained moving image, thereby calculating the user's level of awakeness.

Next, controller 120b determines whether or not the user's level of awakeness obtained by awakeness level obtainer 140 meets the predetermined criterion (step S302). If controller 120b determines that the awakeness level does not meet the predetermined criterion (No in step S302), awakeness level obtainer 140 and controller 120b continue to execute the operations of step S301 and step S302.

On the other hand, upon determination that the user's level of awakeness meets the predetermined criterion (Yes in step S302), controller 120b starts controlling air conditioner 220. Specifically, if controller 120b determines that the user's level of awakeness meets the predetermined criterion (Yes in step S302), heat dissipation intensity obtainer 110 obtains the user's heat dissipation intensity from heat dissipation intensity sensor 210 (step S101), and controller 120b controls air conditioner 220 based on the user's heat dissipation intensity obtained by heat dissipation intensity obtainer 110 (step S102).

Advantageous Effects, Etc

As described above, wakefulness inducing device 100b according to Embodiment 3 includes awakeness level obtainer 140 that obtains the user's level of awakeness. Controller 120b determines whether or not the user's level of awakeness obtained by awakeness level obtainer 140 meets the predetermined criterion. If the user's level of awakeness obtained by awakeness level obtainer 140 meets the predetermined criterion, controller 120b starts controlling air conditioner 220.

With this configuration, wakefulness inducing device 100b starts controlling air conditioner 220, at an appropriate timing, for the user whose wakefulness needs to be induced. Accordingly, wakefulness inducing device 100b according to the aspect of the present disclosure induces the user's wakefulness at an appropriate timing.

Embodiment 4

Now, a wakefulness inducing device and a wakefulness inducing system according to Embodiment 4 will be described. The same reference marks as those of Embodiments 1 to 3 are used to represent equivalent elements, and the detailed explanation thereof may be omitted or simplified.

Configurations

Configurations of wakefulness inducing device 100c and wakefulness inducing system 200c according to Embodiment 4 will be described with reference to FIG. 12.

Figure 12:
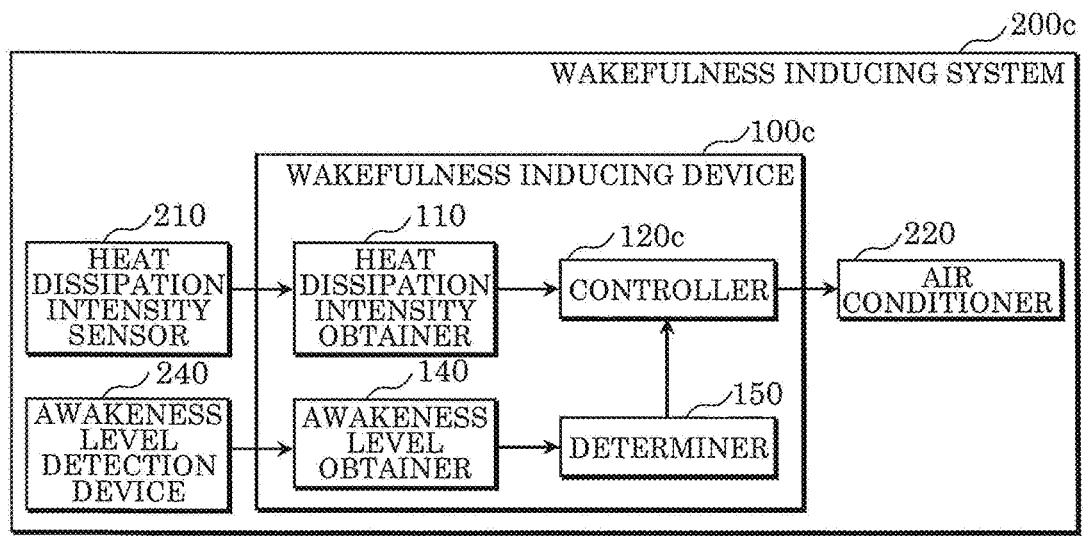
FIG. 12 is a block diagram illustrating characteristic functional configurations of a wakefulness inducing device and a wakefulness inducing system according to Embodiment 4.

FIG. 12 is a block diagram illustrating characteristic functional configurations of wakefulness inducing device 100c and wakefulness inducing system 200c according to Embodiment 4.

Wakefulness inducing device 100c includes determiner 150 in addition to the configuration of wakefulness inducing device 100b. Wakefulness inducing system 200c includes wakefulness inducing device 100c, heat dissipation intensity sensor 210, air conditioner 220, and awakeness level detection device 240.

Determiner 150 is a control device that determines the user's level of ease of awakening. Determiner 150 includes, for example, a CPU and a memory that stores control programs executed by the CPU. Note that determiner 150 may include, for example, an exclusive electronic circuit that executes the control programs as hardware.

Determiner 150 determines, for example, the changeability in the user's level of awakeness relative to a time. The awakeness levels of some users are more changeable (in other words, the wakefulness is easily induced) by the control of air conditioner 220, while the awakeness levels of other users are less changeable (in other words, the wakefulness is not easily induced). Determiner 150 determines whether or not the user, whose wakefulness is to be induced, wakes up easily.

Controller 120c is a control device that controls the temperature, speed, direction, and amount of air flow of air conditioner 220 based on the user's heat dissipation intensity obtained by heat dissipation intensity obtainer 110, thereby repeatedly increasing and decreasing the user's heat dissipation intensity. Controller 120c includes, for example, a CPU and a memory that stores control programs executed by the CPU. Note that controller 120c may include, for example, an exclusive electronic circuit that executes the control programs as hardware.

Controller 120c controls air conditioner 220 based on the result of determination by determiner 150. Specifically, controller 120c performs control to change the operating conditions of air conditioner 220 based on the result of determination by determiner 150. For example, if determiner 150 determines that the user does not easily wake up, controller 120c changes the values shown in FIG. 6A to perform control to change the operating conditions of air conditioner 220 so that the user wakes up more easily. Example of changing the values include shortening first time period t1 or second time period t2, increasing first heat dissipation intensity Hmax, and decreasing second heat dissipation intensity Hmin.

Note that determiner 150 may determine the user's level of ease of awakening in two stages: whether or not the user wakes up easily, or may evaluate the level in a plurality of stages. If determiner 150 evaluates the user's level of ease of awakening in the plurality of stages, controller 120c may perform control to change the operating conditions of air conditioner 220 for example, by changing the decrease of first time period t1 in accordance with the evaluation result.

Determiner 150 and controller 120c may include a common CPU and a common memory, which stores control programs executed by the CPU. Alternatively, each of determiner 150 and controller 120c may include a CPU and a memory that stores control programs executed by the CPU.

Operations

Now, operations of wakefulness inducing device 100c and wakefulness inducing system 200c according to Embodiment 4 will be described with reference to FIG. 13.

Figure 13:
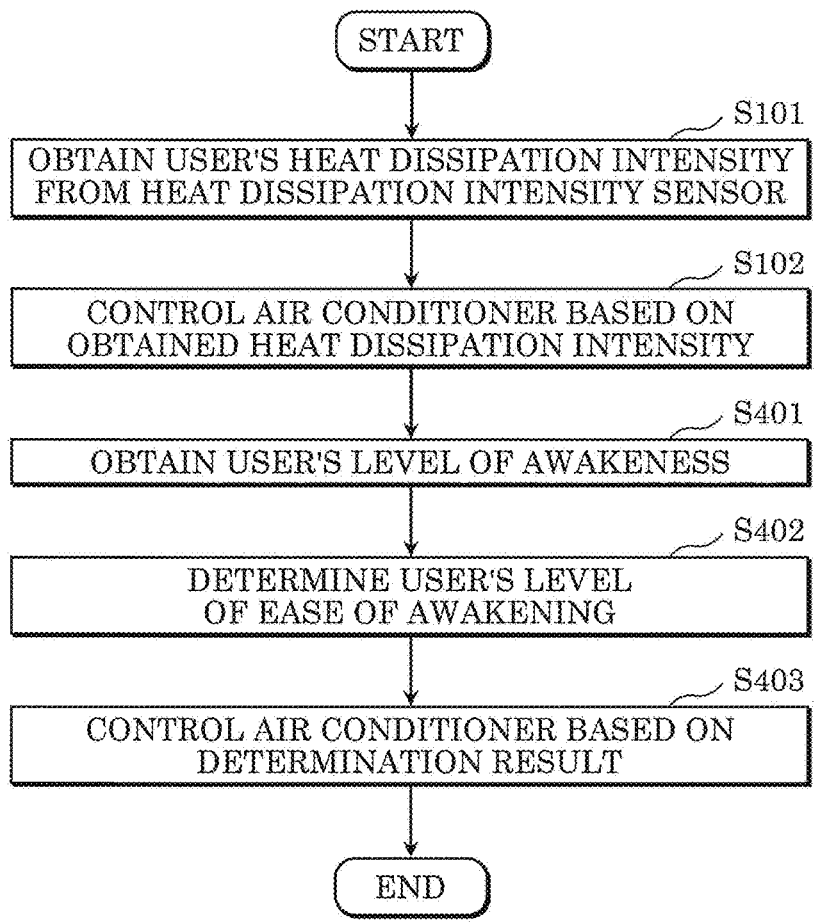
FIG. 13 is a flowchart for illustrating how the wakefulness inducing device according to Embodiment 4 controls the air conditioner.

FIG. 13 is a flowchart for illustrating operation procedures, how wakefulness inducing device 100c according to Embodiment 4 controls air conditioner 220.

First, heat dissipation intensity obtainer 110 obtains the user's heat dissipation intensity from heat dissipation intensity sensor 210 (step S101).

Next, controller 120c controls air conditioner 220 based on the user's heat dissipation intensity obtained by heat dissipation intensity obtainer 110 (step S102).

Then, awakeness level obtainer 140 obtains the user's moving image from awakeness level detection device 240 and calculates the user's level of awakeness from the moving image, thereby obtaining the user's level of awakeness (step S401).

Next, determiner 150 repeatedly obtains the user's level of awakeness from awakeness level obtainer 140 to determine the user's level of ease of awakening (step S402). In step S402, for example, determiner 150 may calculate the amount of change in user's level of awakeness in a predetermined time period of, for example, several tens of minutes to determine based on the amount of change whether or not the user wakes up easily. Alternatively, determiner 150 may determine whether or not the user wakes up easily based on the user's level of awakeness in a predetermined time period after controller 120c has started controlling air conditioner 220.

Then, controller 120c controls air conditioner 220 based on the result of determination by determiner 150 on the user's level of ease of awakening (step S403). Specifically, in step S403, controller 120c performs control to change the operating conditions of air conditioner 220 based on the result of determination by determiner 150. For example, if determiner 150 determines that the user does not easily wake up, controller 120c changes the values shown in FIG. 6A to perform control to change the operating conditions of air conditioner 220 so that the user wakes up more easily. Example of changing the values include shortening first time period t1 or second time period t2, increasing first heat dissipation intensity Hmax, and decreasing second heat dissipation intensity Hmin.

Advantageous Effects, Etc

As described above, wakefulness inducing device 100c according to Embodiment 4 includes determiner 150, which determines the user's level of ease of awakening. Controller 120c controls air conditioner 220 based on the result of determination by determiner 150.

With this configuration, wakefulness inducing device 100c controls air conditioner 220 under the operating conditions according to the user's ease of awakening. Accordingly, wakefulness inducing device 100c appropriately induces the wakefulness of users in accordance with the individuals.

Embodiment 5

Now, a wakefulness inducing device and a wakefulness inducing system according to Embodiment 5 will be described. The same reference marks as those of Embodiments 1 to 4 are used to represent equivalent elements, and the detailed explanation thereof may be omitted or simplified.

Configurations

Configurations of wakefulness inducing device 100d and wakefulness inducing system 200d according to Embodiment 5 will be described with reference to FIG. 14.

Figure 14:
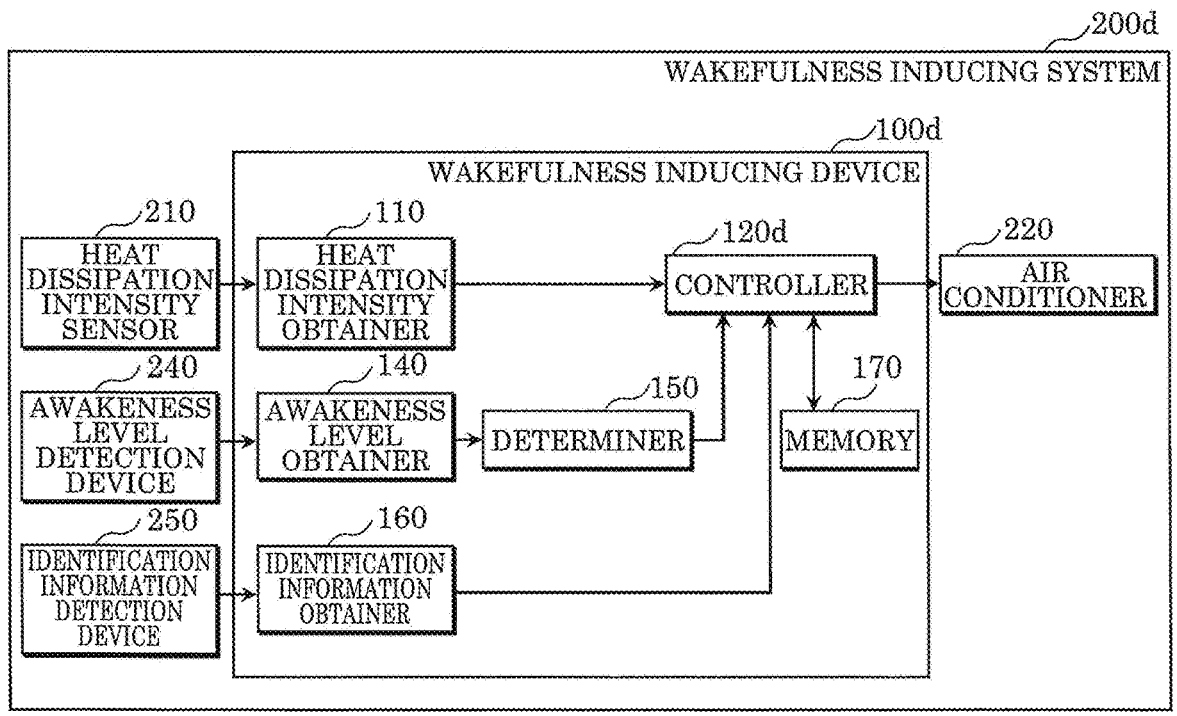
FIG. 14 is a block diagram illustrating characteristic functional configurations of a wakefulness inducing device and a wakefulness inducing system according to Embodiment 5.

FIG. 14 is a block diagram illustrating characteristic functional configurations of wakefulness inducing device 100d and wakefulness inducing system 200d according to Embodiment 5.

Wakefulness inducing device 100d includes identification information obtainer 160 and memory 170 in addition to the configuration of wakefulness inducing device 100c. Wakefulness inducing system 200d includes wakefulness inducing device 100d, heat dissipation intensity sensor 210, air conditioner 220, awakeness level detection device 240, and identification information detection device 250.

Identification information detection device 250 is a device that detects information (identification information) specific to each user to personally identify the user. Identification information detection device 250 may be, for example, a camera that takes an image of the user, or a fingerprint sensor that detects the user's fingerprints, as long as detecting identification information for identifying an individual user. Identification information detection device 250 sends the detected identification information to identification information obtainer 160.

Identification information obtainer 160 is an interface for obtaining the information detected by identification information detection device 250. As long as receiving the identification information, which has been sent from identification information detection device 250 and is for identifying the individual user; identification information obtainer 160 may be connected to identification information detection device 250 by wire, or may be communicatively connected to identification information detection device 250 by wireless.

Controller 120d is a control device that controls the temperature, speed, direction, and amount of air flow of air conditioner 220 based on the user's heat dissipation intensity obtained by heat dissipation intensity obtainer 110, thereby repeatedly increasing and decreasing the user's heat dissipation intensity. Controller 120d includes, for example, a CPU and a memory that stores control programs executed by the CPU. The memory may be memory 170, or may be provided in wakefulness inducing device 100d in addition to memory 170. Note that controller 120d may include, for example, an exclusive electronic circuit that executes the control programs as hardware.

Controller 120d controls memory 170 to store the user's level of ease of awakening, which has been obtained by awakeness level obtainer 140, in association with the user indicated by the identification information, which has been obtained by identification information obtainer 160. Specifically, controller 120d refers to a database based on the information, which has been sent form identification information obtainer 160 and indicates, for example, a facial image or a fingerprint image, thereby identifying the user. The database stores the information stored, for example, in memory 170 in advance in association with the user's name.

Controller 120d causes memory 170 to store the user's level of ease of awakening, which has been determined by determiner 150 based on the user's level of awakeness obtained by awakeness level obtainer 140, in association with the identified user.

Note that there is no need for controller 120d to execute the identification of the user. For example, identification information detection device 250 may execute the identification. In this case, identification information detection device 250 may send only the information (e.g., the user's name) indicating the result of identifying the user to identification information obtainer 160. Alternatively, for example, identification information obtainer 160 may execute the user identification. In this case, identification information obtainer 160 may further refer to a database based on the information, which has been sent from identification information detection device 250 and indicates, for example, a facial image or a fingerprint image, thereby identifying the user. The database stores the information stored, for example, in memory 170 in advance in association with the user's name. In this case, identification information obtainer 160 may include a CPU for executing control programs for identifying the user, and a memory storing the control programs. The memory may be memory 170, or may be provided in wakefulness inducing device 100d in addition to memory 170.

In the following description, identification information detection device 250 takes the user's fingerprint image, and sends the fingerprint image as the identification information for identifying the user to identification information obtainer 160. Identification information obtainer 160 obtains the fingerprint image to identify the user.

Operations

Now, operations of wakefulness inducing device 100d and wakefulness inducing system 200d according to Embodiment 5 will be described with reference to FIG. 15.

Figure 15:
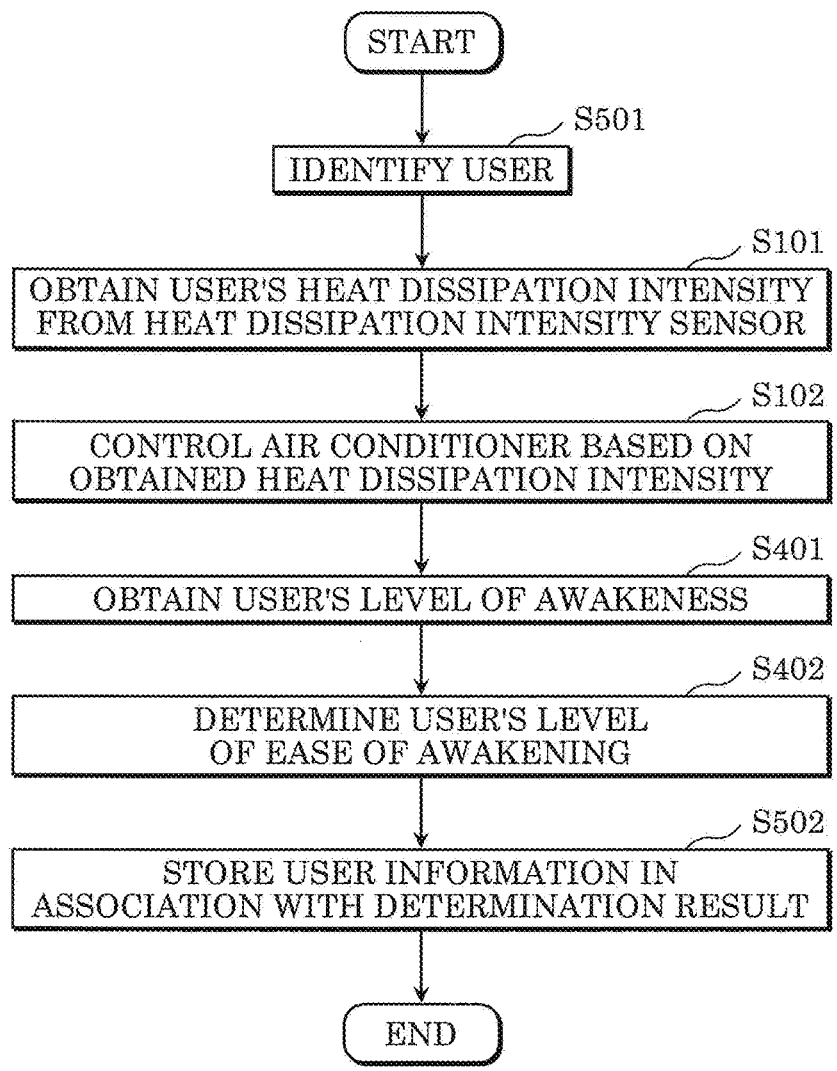
FIG. 15 is a flowchart for illustrating how the wakefulness inducing device according to Embodiment 5 controls the air conditioner.

FIG. 15 is a flowchart for illustrating operation procedures, how wakefulness inducing device 100d according to Embodiment 5 controls air conditioner 220.

First, wakefulness inducing device 100d identifies the user (step S501). In step S501, for example, identification information obtainer 160 identifies the user based on the user's fingerprint image and the database. The user's fingerprint image has been sent from identification information detection device 250. The database stores the fingerprint image stored, for example, in memory 170 in advance in association with the user's name.

Next, heat dissipation intensity obtainer 110 obtains the user's heat dissipation intensity from heat dissipation intensity sensor 210 (step S101).

Then, controller 120d controls air conditioner 220 based on the user's heat dissipation intensity obtained by heat dissipation intensity obtainer 110 (step S102).

Next, awakeness level obtainer 140 obtains the user's moving image from awakeness level detection device 240, and calculates the user's level of awakeness from the moving image, thereby obtaining the user's level of awakeness (step S401).

Then, determiner 150 repeatedly obtains the user's level of awakeness from awakeness level obtainer 140, and determines the user's level of ease of awakening (step S402).

After that, controller 120d causes memory 170 to store the result of determination by determiner 150 on the user's level of ease of awakening in association with the user (step S502).

For example, if the user uses wakefulness inducing device 100d again, and identification information obtainer 160 identifies the user, controller 120d refers to the user's level of ease of awakening stored in memory 170. Controller 120d controls air conditioner 220 under the operating conditions based on the referred user's level of ease of awakening.

Advantageous Effects, Etc

As described above, wakefulness inducing device 100d according to Embodiment 5 includes identification information obtainer 160 and memory 170. Identification information obtainer 160 obtains identification information for identifying the user. Memory 170 stores the user's level of ease of awakening in association with the user. Controller 120d causes memory 170 to store the user's level of ease of awakening, which has been obtained by awakeness level obtainer 140, in association with the user indicated by the identification information, which has been obtained by identification information obtainer 160.

With this configuration, wakefulness inducing device 100d stores the ease of awakening of each person whose wakefulness is to be induced. Wakefulness inducing system 200*d* stores user's individual information, and controls air conditioner 220 based on the stored information. The individual information includes the information that some target people are easily awaken by controlling the air flow temperature to be high, while other target people are easily awaken by controlling the air flow speed to be high. With this configuration, wakefulness inducing device 100*d* easily induces the user's wakefulness of each user.

Embodiment 6

Now, a wakefulness inducing device and a wakefulness inducing system according to Embodiment 6 will be described. The same reference marks as those of Embodiments 1 to 5 are used to represent equivalent elements, and the detailed explanation thereof may be omitted or simplified.

Configurations

Configurations of wakefulness inducing device 100*e* and wakefulness inducing system 200*e* according to Embodiment 6 will be described with reference to FIG. 16.

Figure 16:
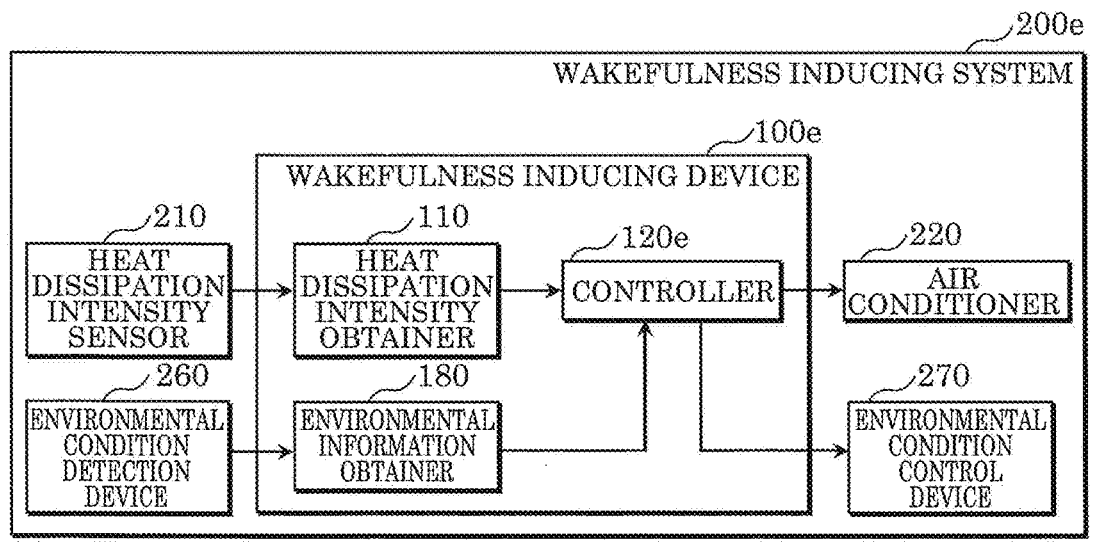
FIG. 16 is a block diagram illustrating characteristic functional configurations of a wakefulness inducing device and a wakefulness inducing system according to Embodiment 6.
Figure 17:
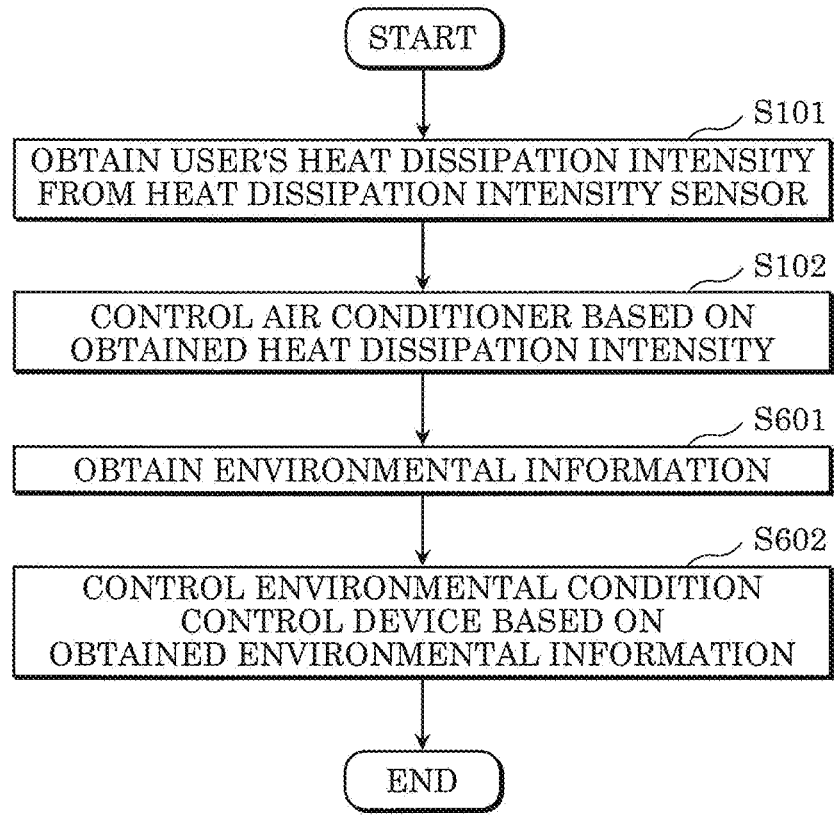
FIG. 17 is a flowchart for illustrating how the wakefulness inducing device according to Embodiment 6 controls the air conditioner.

FIG. 16 is a block diagram illustrating characteristic functional configurations of wakefulness inducing device 100*e* and wakefulness inducing system 200*e* according to Embodiment 6.

Wakefulness inducing device 100*e* includes environmental information obtainer 180 in addition to the configuration of wakefulness inducing device 100. Wakefulness inducing system 200*e* includes wakefulness inducing device 100*e*, heat dissipation intensity sensor 210, air conditioner 220, environmental condition detection device 260, and environmental condition control device 270.

Environmental condition detection device 260 is a device for detecting the environmental condition around the user. Environmental condition detection device 260 includes at least one of, for example, a temperature sensor, a humidity sensor, an illuminance sensor, a color temperature sensor, an air flow speed sensor, an oxygen concentration sensor, a carbon dioxide concentration sensor, a vibration sensor, or a microphone. Specifically, environmental condition detection device 260 detects the temperature around the user when including the temperature sensor, the humidity around the user when including the humidity sensor, and the illuminance around the user when including the illuminance sensor. Environmental condition detection device 260 detects the color temperature of the light around the user when including the color temperature sensor, and the air flow speed around the user when including the air flow speed sensor. Environmental condition detection device 260 detects the oxygen concentration around the user when including the oxygen concentration sensor, and the carbon dioxide concentration around the user when including the carbon dioxide concentration sensor. Environmental condition detection device 260 detects the amount of physical vibration (e.g., the amount of vibration of the seat when the user is seated) around the user when including the vibration sensor, and the amount of sound around the user when including the microphone. In the following description, the information detected by environmental condition detection device 260 and indicating the above-described environmental conditions around the user will be collectively referred to as "environmental information." Environmental condition detection device 260 sends the detected environmental information to environmental information obtainer 180.

Environmental information obtainer 180 is an interface for obtaining environmental information, which has been sent from environmental condition detection device 260 and indicates the environmental condition around the user. As long as receiving the environmental information, which has been sent from environmental condition detection device 260 and indicates the environmental condition around the user; environmental information obtainer 180 may be connected to environmental condition detection device 260 by wire, or may be communicatively connected to environmental condition detection device 260 by wireless.

Environmental condition control device 270 is a device for controlling the environmental condition around the user. The environmental condition around the user is here at least one of the illuminance of the environmental light around the user, the color temperature of the environmental light, the oxygen concentration around the user, the carbon dioxide concentration around the user, the music provided for the user, the vibration applied to the user, the opening/closing state of a window located near the user, or the opening/closing state of a curtain located near the user. That is, as long as being a device capable of controlling at least one of the above-described environmental conditions around the user, environmental condition control device 270 may be a lighting system, speaker and/or amplifier, a motor for opening/closing the window and/or curtain located near the user, a solenoid valve for opening/closing a tank filled with carbon dioxide gas or oxygen gas, or a vibration generating device for applying vibration to the user.

Controller 120*e* is a control device that controls the temperature, speed, direction, and amount of air flow of air conditioner 220 based on the user's heat dissipation intensity obtained by heat dissipation intensity obtainer 110, thereby repeatedly increasing and decreasing the user's heat dissipation intensity. Controller 120*e* includes, for example, a CPU and a memory that stores control programs executed by the CPU. Note that controller 120*e* may include, for example, an exclusive electronic circuit that executes the control programs as hardware.

While controlling air conditioner 220 based on the user's heat dissipation intensity obtained by heat dissipation intensity obtainer 110, controller 120*e* further controls environmental condition control device 270 to perform control to alternate the user's heat dissipation intensity.

Controller 120*e* controls environmental condition control device 270 based on the environmental information obtained by environmental information obtainer 180. If, for example, environmental condition control device 270 is a lighting system, and environmental condition detection device 260 is an illuminance sensor; controller 120*e* controls air conditioner 220 to control a change in the user's heat dissipation intensity. In addition, if the illuminance sensor has detected a low ambient illuminance around the user, controller 120*e* further controls the lighting system to light up the environment around the user, thereby inducing the user's wakefulness.

Operations

Now, operations of wakefulness inducing device 100*e* and wakefulness inducing system 200*e* according to Embodiment 6 will be described with reference to FIG. 16.

FIG. 16 is a flowchart for illustrating operation procedures, how wakefulness inducing device 100*e* according to Embodiment 6 controls air conditioner 220.

First, heat dissipation intensity obtainer 110 obtains the user's heat dissipation intensity from heat dissipation intensity sensor 210 (step S101).

Next, controller 120e controls air conditioner 220 based on the user's heat dissipation intensity obtained by heat dissipation intensity obtainer 110 (step S102).

Then, environmental information obtainer 180 obtains, from environmental condition detection device 260, the environmental information indicating the environmental condition around the user (step S601). In step S601, for example, if environmental condition detection device 260 is an illuminance sensor, environmental information obtainer 180 obtains the illuminance around the user as the environmental information. In step S601, for example, if environmental condition detection device 260 is a microphone, environmental information obtainer 180 obtains the amount of sound around the user as the environmental information.

Next, controller 120e controls environmental condition control device 270 based on the environmental information obtained by environmental information obtainer 180 (step S602). In step S602, for example, assume that environmental condition detection device 260 is an illuminance sensor, and environmental condition control device 270 is a lighting system. Upon determination, based on the environmental information, that it is dark around the user; controller 120e controls the lighting system to light up the environment around the user, thereby inducing the user's wakefulness. In step S602, for example, assume that environmental condition detection device 260 is a microphone, and environmental condition control device 270 is a speaker and a microphone. Upon determination, based on the environmental information, that it is quiet around the user; controller 120e controls the speaker and the amplifier to provide the user with sound, thereby inducing the user's wakefulness.

Advantageous Effects, Etc

As described above, controller 120e included in wakefulness inducing device 100e according to Embodiment 6 further controls environmental condition control device 270, which controls the environmental condition around the user. The environmental condition around the user is here at least one of the illuminance of the environmental light around the user, the color temperature of the environmental light, the oxygen concentration around the user, the carbon dioxide concentration around the user, the music provided for the user, the vibration applied to the user, the opening/closing state of a window located near the user, or the opening/closing state of a curtain located near the user. While controlling air conditioner 220 based on the user's heat dissipation intensity obtained by heat dissipation intensity obtainer 110, controller 120e further controls environmental condition control device 270 to alternate the user's heat dissipation intensity.

Such a configuration allows for control of not only the air conditions but also the illuminance and color temperature of the environmental light around the user and the other conditions to awaken the user in a short time at low energy consumption. Such a configuration further allows for control of the oxygen concentration, carbon dioxide concentration, sound, and vibration around the user to more easily induce the user's wakefulness. Accordingly, even if the user's wakefulness is not induced well, wakefulness inducing device 100e further executes a wakefulness inducing method that may induce the user's wakefulness. That is, such a configuration allows for easier induction of the user's wakefulness.

For example, wakefulness inducing device 100e may further include environmental information obtainer 180. Environmental information obtainer 180 obtains environmental information indicating the environmental condition around the user from at least one of a temperature sensor, a humidity sensor, an illuminance sensor, a color temperature sensor, an air flow speed sensor, an oxygen concentration sensor, a carbon dioxide concentration sensor, a vibration sensor, or a microphone. Controller 120e may control environmental condition control device 270 based on the environmental information obtained by environmental information obtainer 180.

Such a configuration allows for addition of at least one of the room temperature, the humidity, the illuminance, the color temperature, the air flow speed, the oxygen concentration, the carbon dioxide concentration, the vibration, or the sound to more accurately determine how easy the environmental condition around the user awaken the user. For example, the following facts of the environmental condition around the user are known. The lower the room temperature is, the more easily the person wakes up. The lower the humidity is, the more easily the person wakes up. The higher the environment illuminance is, the more easily the person wakes up. The higher the color temperature of the environmental light is, the more easily the person wakes up. Accordingly, wakefulness inducing device 100e controls environmental condition control device 270 based on the environmental condition around the user. With this configuration, wakefulness inducing device 100e changes, based on the environmental condition around the user, the environment around the user so as to more easily awaken the person.

Embodiment 7

Now, a wakefulness inducing device and a wakefulness inducing system according to Embodiment 7 will be described. The same reference marks as those of Embodiment 1 are used to represent equivalent elements, and the detailed explanation thereof may be omitted or simplified.

Configurations

Configurations of wakefulness inducing device 100f and wakefulness inducing system 200f according to Embodiment 7 will be described with reference to FIG. 18.

Figure 18:
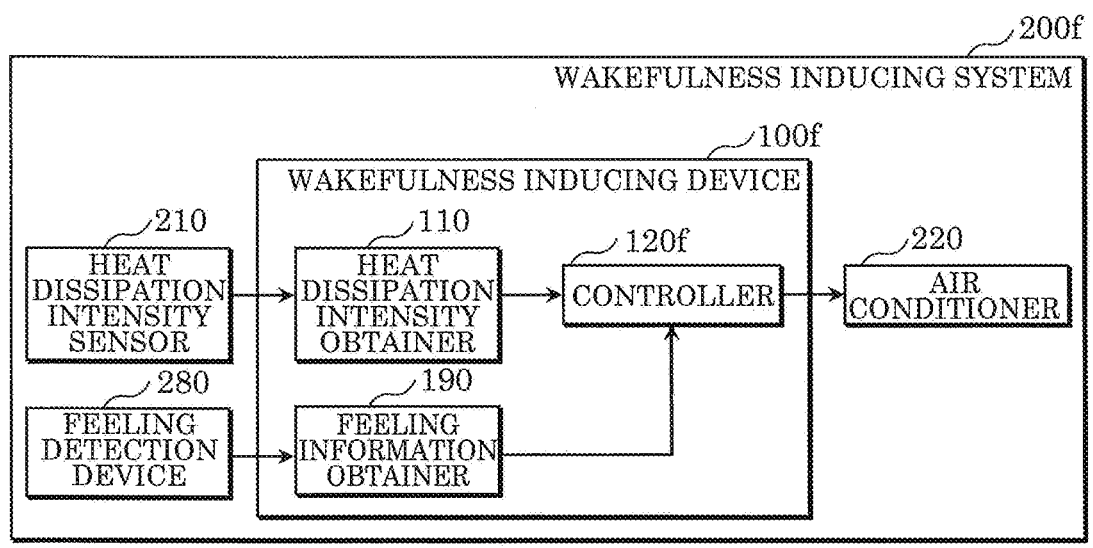
FIG. 18 is a block diagram illustrating characteristic functional configurations of a wakefulness inducing device and a wakefulness inducing system according to Embodiment 7.

FIG. 18 is a block diagram illustrating characteristic functional configurations of wakefulness inducing device 100f and wakefulness inducing system 200f according to Embodiment 7.

As shown in FIG. 18, wakefulness inducing device 100f includes feeling information obtainer 190 in addition to the configuration of wakefulness inducing device 100. Wakefulness inducing system 200f includes wakefulness inducing device 100f, heat dissipation intensity sensor 210, air conditioner 220, and feeling detection device 280.

Feeling detection device 280 is a device for detecting the user's feeling, whether the user feels comfortable or uncomfortable. As long as detecting the feeling, whether the user feels comfortable or uncomfortable; feeling detection device 280 is not particularly limited. Feeling detection device 280 may be, for example, a camera for taking an image of, for example, the expression or complexion of the user. Feeling detection device 280 sends feeling information indicating the user's feeling to feeling information obtainer 190. If, for example, feeling detection device 280 is a camera, feeling detection device 280 sends the taken user's image as the feeling information.

Feeling information obtainer 190 is an interface for obtaining the feeling information indicating the user's feeling. As long as receiving the feeling information sent from feeling detection device 280, feeling information obtainer 190 may be connected to feeling detection device 280 by wire, or may be communicatively connected to feeling detection device 280 by wireless.

Controller 120f is a control device that controls the temperature, speed, direction, and amount of air flow of air conditioner 220 based on the user's heat dissipation intensity obtained by heat dissipation intensity obtainer 110, thereby repeatedly increasing and decreasing the user's heat dissipation intensity. Controller 120f includes, for example, a CPU and a memory that stores control programs executed by the CPU. Note that controller 120f may include, for example, an exclusive electronic circuit that executes the control programs as hardware.

Controller 120f controls air conditioner 220 based on the feeling information, which has been obtained by feeling information obtainer 190 and indicates the user's feeling. For example, assume that controller 120f determines that the user feels comfortable, for example, the user has fun or joy, as a result of analyzing, by a known method, the image which has been obtained as the feeling information and shows the user's face. Then, controller 120f maintains the operating conditions of air conditioner 220. On the other hand, for example, assume that controller 120f determines that the user feels comfortable, for example, the user is upset or sad, as a result of analyzing, by a known method, the image which has been obtained as the feeling information and shows the user's face. Then, controller 120f changes the operating conditions of air conditioner 220 or stops air conditioner 220.

There is no need for controller 120f to execute the determination on the user's feeling. For example, feeling detection device 280 may execute the determination. In this case, feeling detection device 280 may send only the information indicating the result of determining the user's feeling (e.g., the information indicating that the user feels comfortable or uncomfortable) to feeling information obtainer 190. In this case, feeling information obtainer 190 obtains the information indicating the result determined by feeling detection device 280 as the feeling information.

For example, feeling information obtainer 190 may execute the determination on the user's feeling. In this case, feeling information obtainer. 190 further determines the user's feeling based on a face photo, which has been sent from feeling detection device 280 and is for determining the user's feeling. In this case, feeling information obtainer 190 may include a CPU for executing control programs for determining the user's feeling, and a memory storing the control programs.

In the following description, feeling detection device 280 takes an image of the user's face, and sends the taken image as the feeling information for determining the user's feeling to feeling information obtainer 190. Feeling information obtainer 190 obtains the image. Controller 120f analyzes the user's image obtained by feeling information obtainer 190, thereby determining the user's feeling.

Operations

Now, operations of wakefulness inducing device 100f and wakefulness inducing system 200f according to Embodiment 7 will be described with reference to FIG. 19.

Figure 19:
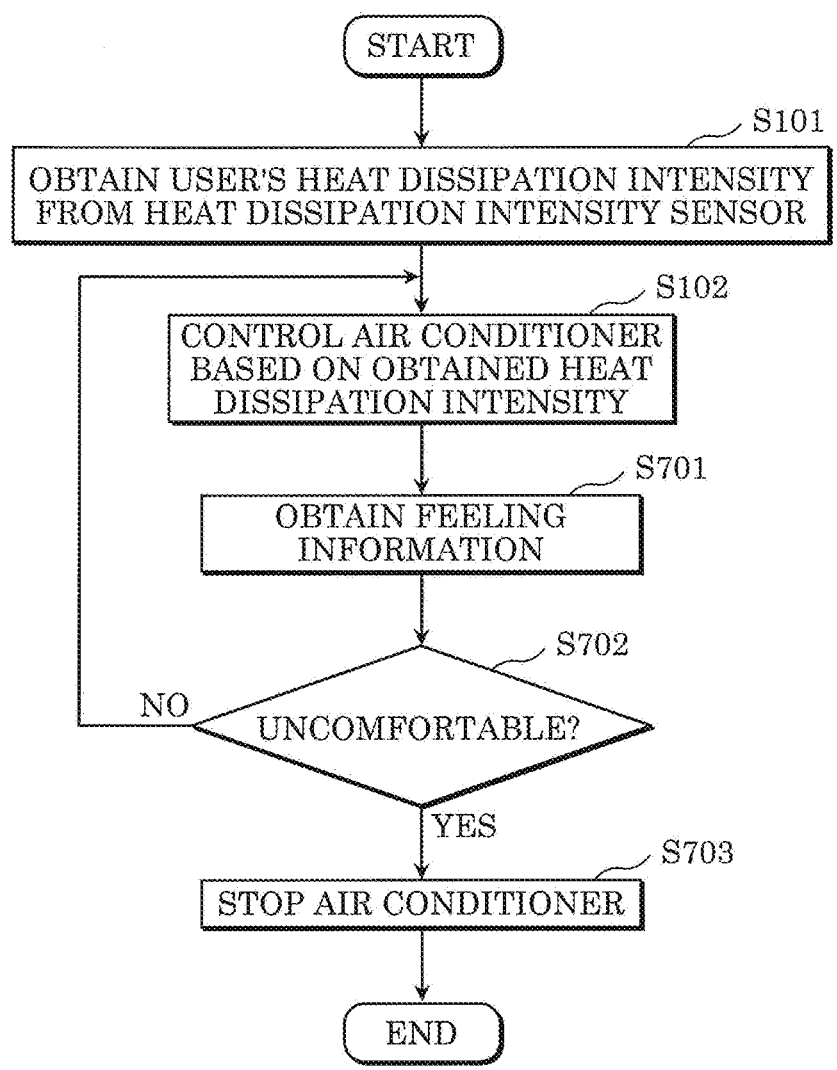
FIG. 19 is a flowchart for illustrating how the wakefulness inducing device according to Embodiment 7 controls the air conditioner.

FIG. 19 is a flowchart for illustrating operation procedures, how wakefulness inducing device 100f according to Embodiment 7 controls air conditioner 220.

First, heat dissipation intensity obtainer 110 obtains the user's heat dissipation intensity from heat dissipation intensity sensor 210 (step S101).

Next, controller 120f controls air conditioner 220 based on the user's heat dissipation intensity obtained by heat dissipation intensity obtainer 110 (step S102).

Then, feeling information obtainer 190 obtains the feeling information indicating the user's feeling from feeling detection device 280 (step S701). In step S701, for example, feeling detection device 280 takes an image of the user's face, and sends the taken image as the feeling information to feeling information obtainer 190. Feeling information obtainer 190 obtains the image sent from feeling detection device 280 as the feeling information.

Next, controller 120f determines, based on the obtained feeling information, whether or not the user feels uncomfortable (step S702).

Upon determination that the user does not feel uncomfortable (No in step S702), controller 120f returns the process to step S102 and causes air conditioner 220 to continuously execute the operation under the same conditions.

On the other hand, upon determination that the user feels uncomfortable (Yes in step S702), controller 120f performs control to stop the operation of, for example, air conditioner 220 (step S703). In step S703, controller 120f may perform control to change the operating conditions of air conditioner 220 by, for example, increasing the air flow temperature or decreasing the air flow speed.

Advantageous Effects, Etc

As described above, wakefulness inducing device 100f according to Embodiment 7 incudes feeling information obtainer 190, which obtains the feeling information indicating the user's feeling. Controller 120f controls air conditioner 220 based on the feeling information obtained by feeling information obtainer 190.

With this simple configuration, wakefulness inducing device 100f controls air conditioner 220 under the conditions desired by the user whose wakefulness is to be induced. Such a configuration allows for determination on, for example, whether or not the environmental control, which has been performed to induce the user's wakefulness, is uncomfortable for the user. Upon determination that the control is uncomfortable, the configuration allows for control to stop the control.

Other Embodiments

The wakefulness inducing control device and the wakefulness inducing system according to the present disclosure have been described above based on the embodiments. The present disclosure is, however, not limited to the embodiments. The present disclosure includes, for example, embodiments obtained by variously modifying the embodiments as conceived by those skilled in the art, or embodiments implemented by freely combining the constituent elements and functions of the embodiments within the scope of the present disclosure.

For example, the present disclosure may be implemented not only as a wakefulness inducing device or a wakefulness inducing system, but also as a program including, as steps, the processing performed by the constituent elements of the wakefulness inducing device and wakefulness inducing system. The present disclosure may also be implemented as a recording medium such as a computer readable digital versatile disc (DVD). The program may be recorded in the recording medium in advance, or may be supplied to the recording medium via a wide area communication network including internet.

That is, the general or specific aspects described above may be implemented by systems, devices, integrated circuits, computer programs, or computer readable recording media, or may be implemented by freely selected combinations of the systems, devices, integrated circuits, computer programs, and recording media.

For example, the conditions where the controller stops controlling the air conditioner (specifically, stops the air conditioner) are not particularly limited. The controller may stop the control every time when a predetermined time period has passed, when the controller receives a stop instruction from the user via an input device, or when the user's level of awakeness meets the predetermined criterion. For example, the air conditioner is controlled in view of the user's level of awakeness, thereby reducing the waste of further awakening the user who is already awake.

For example, the wakefulness inducing system may further include a seat heater, a far-infrared heater, or a Peltier device to apply different amounts of heat to the user's body regions, thereby appropriately controlling the heat dissipation intensities of the respective user's body regions. This configuration allows for easier induction of the user's wakefulness.

For example, the identification information detection device may be a camera that takes an image of, for example, the user's face, the user's iris, or the user's vein. As long as identifying the user, the identification information detection device is not particularly limited.

For example, the feeling detection device may be a camera that takes an image of, for example, the user's expression. The feeling detection device may be a device that measures, for example, the user's heartbeats and/or breathing at millimeter waves based on, for example, vibration of the user's seat to detect the user's feeling as the feeling information based on the user's heart rate variability, the user's heart rate, the user's rate of breathing, the user's depth of breathing. As long as detecting the information that allows for assumption of the user's feeling, the feeling detection device is not particularly limited.

For example, the awakeness level detection device may be, like the feeling detection device, a camera or a device capable of measuring millimeter waves. As long as detecting the information that allows for assumption of the user's level of awakeness, the awakeness level detection device is not particularly limited. In particular, it is known that there is a strong correlation between the awakeness level and the user's eye blink rate or heart rate. The awakeness level detection device may be thus, for example, a device that measures the user's waveform of the blink and heart rate with a camera at millimeter waves and calculates the user's level of awakeness based on the measurement result, thereby detecting the user's level of awakeness.

For example, the color temperature sensor, which detects the color temperature of the environmental light around the user, may be a sensor that detects the light intensity of each wavelength of the environmental light.

INDUSTRIAL APPLICABILITY

The present disclosure is useful as a wakefulness inducing device and a wakefulness inducing system capable of appropriately inducing the wakefulness of people in accordance with the individuals. The present disclosure is used, for example, as a device that controls an air conditioner disposed, for example, in a vehicle or an office to induce the wakefulness of people.

The invention claimed is:

1. A wakefulness inducing device, comprising:
   a heat dissipation intensity obtainer that obtains a thermal image of a person from a thermal image sensor; and
   a controller that (i) determines a surface temperature of the person and a temperature around the person based on the thermal image, (ii) calculates a heat dissipation intensity of the person based on the difference between the determined surface temperature and the determined temperature around the person, and (iii) controls an air conditioner to alternate the person's heat dissipation intensity between a first heat dissipation intensity and a second heat dissipation intensity lower than the first heat dissipation intensity, wherein
   the controller alternates the person's heat dissipation intensity by controlling the air conditioner based on the person's heat dissipation intensity to set a first time period longer than a second time period,
   the first time period is a time period in which the person's heat dissipation intensity increases from the second heat dissipation intensity to the first heat dissipation intensity, and remains at the first heat dissipation intensity, and
   the second time period is a time period in which the person's heat dissipation intensity decreases from the first heat dissipation intensity to the second heat dissipation intensity, and remains at the second heat dissipation intensity.

2. The wakefulness inducing device according to claim 1, wherein
   the first heat dissipation intensity is 45 W/m$^2$ or lower, and
   the second heat dissipation intensity is 25 W/m$^2$ or higher.

3. The wakefulness inducing device according to claim 1, wherein
   to increase the person's heat dissipation intensity, the controller causes the air conditioner to blow, to the person, air with a temperature lower than or equal to the temperature around the person.

4. The wakefulness inducing device according to claim 1, wherein
   to decrease the person's heat dissipation intensity, the controller causes the air conditioner to blow, to the person, air with a temperature higher than the temperature around the person.

5. The wakefulness inducing device according to claim 1, wherein
   the controller causes the air conditioner to selectively execute a plurality of operating modes, among which values of at least one of the first heat dissipation intensity, the second heat dissipation intensity, the first time period, or the second time period are different,
   the wakefulness inducing device further comprises a receiver that receives, from the person, an instruction indicating one of the plurality of operating modes, and
   the controller causes the air conditioner to execute the one of the plurality of operating modes indicated by the instruction received by the receiver from the person.

6. The wakefulness inducing device according to claim 1, further comprising:
   an awakeness level obtainer that obtains a level of awakeness of the person,
   wherein the controller determines whether or not the person's level of awakeness obtained by the awakeness level obtainer meets a predetermined criterion, and starts controlling the air conditioner, if the person's level of awakeness obtained by the awakeness level obtainer meets the predetermined criterion.

7. The wakefulness inducing device according to claim 6, further comprising:

a determiner that determines a level of ease of awakening of the person, wherein the controller controls the air conditioner based on a result of determination by the determiner.

8. The wakefulness inducing device according to claim 6, further comprising:

an identification information obtainer that obtains identification information for identifying the person; and a memory that stores the person's level of ease of awakening in association with the person; wherein the controller causes the memory to store the person's level of ease of awakening obtained by the awakeness level obtainer in association with the person indicated by the identification information obtained by the identification information obtainer.

9. The wakefulness inducing device according to claim 1, wherein the controller further controls an environmental condition control device that controls an environmental condition around the person, the environmental condition around the person is at least one of an illuminance of environmental light around the person, a color temperature of the environmental light, an oxygen concentration around the person, a carbon dioxide concentration around the person, music provided for the person, vibration applied to the person, an opening/closing state of a window located near the person, or an opening/closing state of a curtain located near the person, and while controlling the air conditioner based on the person's heat dissipation intensity, the controller further controls the environmental condition control device to alternate the person's heat dissipation intensity.

10. The wakefulness inducing device according to claim 9, further comprising:

an environmental information obtainer that obtains environmental information indicating the environmental condition around the person from at least one of a temperature sensor, a humidity sensor, an illuminance sensor, a color temperature sensor, an air flow speed sensor, an oxygen concentration sensor, a carbon dioxide concentration sensor, a vibration sensor, or a microphone, wherein the controller controls the environmental condition control device based on the environmental information obtained by the environmental information obtainer.

11. The wakefulness inducing device according to claim 1, further comprising:

a feeling information obtainer that obtains feeling information indicating a feeling of the person, wherein the controller controls the air conditioner based on the feeling information obtained by the feeling information obtainer.

12. A wakefulness inducing system comprising:

the wakefulness inducing device according to claim 1;

the thermal image sensor; and the air conditioner.

13. The wakefulness inducing device according to claim 1, wherein the controller causes the air conditioner to perform a rotation which changes, in turn, a body region of the person to which the air conditioner blows air.

14. The wakefulness inducing device according to claim 1, wherein the controller controls the air conditioner to cause the air conditioner to perform only control for decreasing a surface temperature of the person, to repeatedly alternate the person's heat dissipation intensity.

* * * * *